US010366514B2

(12) United States Patent
Leacock et al.

(10) Patent No.: US 10,366,514 B2
(45) Date of Patent: Jul. 30, 2019

(54) LOCATING COMMUNICANTS IN A MULTI-LOCATION VIRTUAL COMMUNICATIONS ENVIRONMENT

(71) Applicant: Social Communications Company, Eugene, OR (US)

(72) Inventors: Matthew Leacock, Sunnyvale, CA (US); David Van Wie, Eugene, OR (US); Paul J. Brody, Palo Alto, CA (US)

(73) Assignee: Sococo, Inc., Boston, MA (US)

( * ) Notice: Subject to any disclaimer, the term of this patent is extended or adjusted under 35 U.S.C. 154(b) by 695 days.

(21) Appl. No.: 15/010,806

(22) Filed: Jan. 29, 2016

(65) Prior Publication Data
US 2016/0163070 A1    Jun. 9, 2016

Related U.S. Application Data

(63) Continuation of application No. 13/487,159, filed on Jun. 2, 2012, now abandoned, which is a
(Continued)

(51) Int. Cl.
*G06F 3/0481* (2013.01)
*G06T 11/00* (2006.01)
(Continued)

(52) U.S. Cl.
CPC ............ *G06T 11/00* (2013.01); *G06F 3/0481* (2013.01); *G06F 3/0482* (2013.01);
(Continued)

(58) Field of Classification Search
CPC ........... G06F 3/04815; G06F 17/30061; G06F 16/444; G06T 11/00
(Continued)

(56) References Cited

U.S. PATENT DOCUMENTS

| 5,737,533 A | 4/1998 | Hond |
| 5,880,731 A | 3/1999 | Liles et al. |

(Continued)

FOREIGN PATENT DOCUMENTS

| CN | 1678994 A | 10/2005 |
| CN | 1701568 | 11/2005 |

(Continued)

OTHER PUBLICATIONS

Chris Joslin et al., Collaborative Virtual Environments—From Birth to Standardization, IEEE Communications Magazine ( vol. 42, Issue: 4, Apr. 2004.
(Continued)

*Primary Examiner* — Usmaan Saeed
*Assistant Examiner* — Brian E. Weinrich
(74) *Attorney, Agent, or Firm* — Law Office of Edouard Garcia

(57) ABSTRACT

In a network communications environment supporting realtime communications between respective network nodes of a user and other communicants in virtual areas each of which is associated with its own respective set of communicant members, a graphical user interface is provided in connection with the user's network node. The graphical user interface includes controls for establishing presence in respective ones of the virtual areas, managing realtime communications with other communicants in respective ones of the virtual areas, and presenting different views of communicants associated with the network communications environment. Based on user input in connection with the graphical user interface, a presence is established for the user in a selected one of the virtual areas, realtime communications are administered between the user and one or more communicants who are present in the selected virtual area, and a visualization that shows graphical representations,
(Continued)

locations of presence, and realtime activities of communicants across respective ones of the virtual areas is displayed.

17 Claims, 16 Drawing Sheets

Related U.S. Application Data continuation-in-part of application No. 13/209,812, filed on Aug. 15, 2011, now Pat. No. 8,930,472, and a continuation-in-part of application No. 12/354,709, filed on Jan. 15, 2009, now Pat. No. 8,397,168, said application No. 13/209,812 is a continuation-in-part of application No. 12/418,243, filed on Apr. 3, 2009, now Pat. No. 8,191,001, said application No. 13/487,159 is a continuation-in-part of application No. 12/354,709, filed on Jan. 15, 2009, now Pat. No. 8,397,168, and a continuation-in-part of application No. 13/422,757, filed on Mar. 16, 2012, now Pat. No. 8,732,593, which is a continuation-in-part of application No. 12/418,243, filed on Apr. 3, 2009, now Pat. No. 8,191,001, application No. 15/010,806, which is a continuation-in-part of application No. 14/251,505, filed on Apr. 11, 2014, now Pat. No. 9,411,490, which is a continuation-in-part of application No. 13/422,757, filed on Mar. 16, 2012, now Pat. No. 8,732,593, which is a continuation-in-part of application No. 12/418,243, filed on Apr. 3, 2009, now Pat. No. 8,191,001, application No. 15/010,806, which is a continuation-in-part of application No. 14/587,845, filed on Dec. 31, 2014, now abandoned, which is a continuation-in-part of application No. 13/209,812, filed on Aug. 15, 2011, now Pat. No. 8,930,472, and a continuation-in-part of application No. 12/354,709, filed on Jan. 15, 2009, now Pat. No. 8,397,168, which is a continuation-in-part of application No. 12/418,243, filed on Apr. 3, 2009, now Pat. No. 8,191,001.

(60) Provisional application No. 61/042,714, filed on Apr. 5, 2008, provisional application No. 61/373,914, filed on Aug. 16, 2010.

(51) Int. Cl.
| | | |
|---|---|---|
| *G06F 16/44* | (2019.01) | |
| *H04L 12/58* | (2006.01) | |
| *G06F 3/0482* | (2013.01) | |
| *G06F 3/0484* | (2013.01) | |
| *G06F 7/08* | (2006.01) | |
| *G06F 17/22* | (2006.01) | |
| *G06F 17/24* | (2006.01) | |
| *G06F 17/27* | (2006.01) | |
| *H04L 29/08* | (2006.01) | |
| *G06F 15/16* | (2006.01) | |

(52) U.S. Cl.
CPC ...... *G06F 3/04815* (2013.01); *G06F 3/04842* (2013.01); *G06F 3/04845* (2013.01); *G06F 7/08* (2013.01); *G06F 16/444* (2019.01); *G06F 17/2235* (2013.01); *G06F 17/24* (2013.01); *G06F 17/276* (2013.01); *H04L 51/043* (2013.01); *H04L 67/10* (2013.01); *H04L 67/24* (2013.01); *G06F 2203/04803* (2013.01); *H04L 51/32* (2013.01)

(58) Field of Classification Search
USPC ...................................................... 715/757
See application file for complete search history.

(56) References Cited

U.S. PATENT DOCUMENTS

| | | |
|---|---|---|
| 5,956,038 A | 9/1999 | Rekimoto |
| 5,960,173 A * | 9/1999 | Tang ............... G06F 9/54 348/14.08 |
| 5,999,206 A | 12/1999 | Inoue et al. |
| 6,005,578 A | 12/1999 | Cole |
| 6,226,655 B1 | 5/2001 | Borman et al. |
| 6,271,839 B1 * | 8/2001 | Mairs ............... G06F 3/1462 715/807 |
| 6,308,199 B1 | 10/2001 | Katsurabayashi |
| 6,335,927 B1 | 1/2002 | Elliott et al. |
| 6,396,509 B1 | 5/2002 | Cheng |
| 6,426,778 B1 | 7/2002 | Valdez |
| 6,473,096 B1 | 10/2002 | Kobayashi et al. |
| 6,480,191 B1 | 11/2002 | Balabanovic |
| 6,493,001 B1 | 12/2002 | Takagi et al. |
| 6,567,980 B1 | 5/2003 | Jain et al. |
| 6,570,587 B1 | 5/2003 | Efrat et al. |
| 6,704,784 B2 | 3/2004 | Matsuda et al. |
| 6,721,741 B1 | 4/2004 | Eyal et al. |
| 6,772,195 B1 | 8/2004 | Hatlelid et al. |
| 6,833,863 B1 | 12/2004 | Clemens |
| 7,080,096 B1 | 7/2006 | Imamura |
| 7,124,164 B1 | 10/2006 | Chemtob |
| 7,145,898 B1 | 12/2006 | Elliott |
| 7,168,048 B1 | 1/2007 | Goossen et al. |
| 7,240,093 B1 * | 7/2007 | Danieli ............... A63F 13/12 715/757 |
| 7,293,243 B1 | 11/2007 | Ben-Shachar et al. |
| 7,305,438 B2 | 12/2007 | Christensen et al. |
| 7,415,502 B2 | 8/2008 | Vishik et al. |
| 7,467,356 B2 | 12/2008 | Gettman et al. |
| 7,533,346 B2 | 5/2009 | McGrath et al. |
| 7,640,300 B2 | 12/2009 | Wohlgemuth et al. |
| 7,769,806 B2 | 8/2010 | Wie et al. |
| 7,844,724 B2 | 11/2010 | Wie et al. |
| 7,908,663 B2 | 3/2011 | Horvitz et al. |
| 7,958,453 B1 | 6/2011 | Taing |
| 7,979,574 B2 | 7/2011 | Gillo et al. |
| 8,176,186 B2 | 5/2012 | McCanne et al. |
| 8,191,001 B2 | 5/2012 | Wie et al. |
| 8,199,761 B2 | 6/2012 | Barraclough et al. |
| 8,397,168 B2 | 3/2013 | Leacock et al. |
| 8,402,085 B2 | 3/2013 | McCanne et al. |
| 8,578,044 B2 | 11/2013 | Wie et al. |
| 8,621,079 B2 | 12/2013 | Wie et al. |
| 8,705,527 B1 | 4/2014 | Addepalli et al. |
| 8,869,027 B2 * | 10/2014 | Louch ............... G06F 3/0481 715/700 |
| 8,930,472 B2 | 1/2015 | Leacock et al. |
| 2001/0023450 A1 | 9/2001 | Chu |
| 2001/0034740 A1 | 10/2001 | Kerne |
| 2002/0019833 A1 | 2/2002 | Hanamoto |
| 2002/0026388 A1 | 2/2002 | Roebuck |
| 2002/0033844 A1 | 3/2002 | Levy et al. |
| 2002/0033848 A1 | 3/2002 | Sciammarella et al. |
| 2002/0052918 A1 | 5/2002 | Rekimoto et al. |
| 2002/0112028 A1 | 8/2002 | Colwill |
| 2002/0116458 A1 | 8/2002 | Bricklin et al. |
| 2002/0169829 A1 | 11/2002 | Shuster |
| 2002/0188959 A1 | 12/2002 | Piotrowski |
| 2003/0009469 A1 | 1/2003 | Platt et al. |
| 2003/0065558 A1 | 4/2003 | Shaw et al. |
| 2003/0107569 A1 | 6/2003 | Endo et al. |
| 2003/0149731 A1 | 8/2003 | Ohwa |
| 2003/0158953 A1 | 8/2003 | Lal |
| 2003/0184579 A1 | 10/2003 | Zhang et al. |
| 2003/0192049 A1 | 10/2003 | Schneider et al. |
| 2003/0195928 A1 | 10/2003 | Kamijo et al. |
| 2003/0215779 A1 | 11/2003 | Dupont et al. |
| 2004/0061773 A1 | 4/2004 | Liu |
| 2004/0078444 A1 | 4/2004 | Malik |
| 2004/0128350 A1 | 7/2004 | Topfl et al. |
| 2004/0268451 A1 | 12/2004 | Robbin et al. |
| 2005/0021624 A1 | 1/2005 | Herf et al. |
| 2005/0058094 A1 | 3/2005 | Lazaridis et al. |

(56) References Cited

U.S. PATENT DOCUMENTS

| | | |
|---|---|---|
| 2005/0075885 A1 | 4/2005 | Danieli |
| 2005/0086612 A1 | 4/2005 | Gettman et al. |
| 2005/0131924 A1* | 6/2005 | Jones .................. G06F 16/248 707/999.1 |
| 2005/0144247 A1 | 6/2005 | Christensen et al. |
| 2005/0149877 A1* | 7/2005 | Rice .................. G06F 3/04815 715/764 |
| 2005/0154574 A1 | 7/2005 | Takemura et al. |
| 2005/0261980 A1 | 11/2005 | Hadi |
| 2006/0031779 A1 | 2/2006 | Theurer et al. |
| 2006/0041684 A1 | 2/2006 | Daniell et al. |
| 2006/0132482 A1 | 6/2006 | Oh |
| 2006/0136837 A1 | 6/2006 | Ben-Shachar et al. |
| 2006/0293103 A1 | 12/2006 | Mendelsohn |
| 2007/0002057 A1 | 1/2007 | Danzig et al. |
| 2007/0070066 A1 | 3/2007 | Bakhash |
| 2007/0098238 A1 | 5/2007 | Obrador |
| 2007/0156908 A1 | 7/2007 | Szomolanyi et al. |
| 2007/0160129 A1 | 7/2007 | Fujisawa et al. |
| 2007/0184855 A1 | 8/2007 | Klassen et al. |
| 2007/0192427 A1 | 8/2007 | Berstis et al. |
| 2007/0198726 A1 | 8/2007 | Marco et al. |
| 2007/0220568 A1 | 9/2007 | Fukasawa |
| 2007/0226357 A1 | 9/2007 | McMurry et al. |
| 2007/0233785 A1 | 10/2007 | Abraham et al. |
| 2007/0286366 A1 | 12/2007 | Deboy et al. |
| 2007/0291706 A1 | 12/2007 | Miller et al. |
| 2007/0299778 A1 | 12/2007 | Haveson et al. |
| 2008/0033941 A1 | 2/2008 | Parrish |
| 2008/0039124 A1 | 2/2008 | Linder et al. |
| 2008/0049622 A1 | 2/2008 | Previdi et al. |
| 2008/0086696 A1 | 4/2008 | Prakash et al. |
| 2008/0091692 A1 | 4/2008 | Keith et al. |
| 2008/0098121 A1 | 4/2008 | Wu |
| 2008/0101561 A1 | 5/2008 | Choi et al. |
| 2008/0133580 A1 | 6/2008 | Wanless et al. |
| 2008/0208605 A1 | 8/2008 | Sinha et al. |
| 2008/0209075 A1 | 8/2008 | Shamma |
| 2008/0214204 A1 | 9/2008 | Ramer et al. |
| 2008/0221998 A1 | 9/2008 | Mendelsohn et al. |
| 2008/0250115 A1 | 10/2008 | Iyer |
| 2008/0256107 A1 | 10/2008 | Banga et al. |
| 2008/0262910 A1 | 10/2008 | Altberg et al. |
| 2008/0262911 A1 | 10/2008 | Altberg et al. |
| 2008/0263458 A1 | 10/2008 | Altberg et al. |
| 2008/0263460 A1 | 10/2008 | Altberg et al. |
| 2008/0301557 A1 | 12/2008 | Kotlyar |
| 2009/0018912 A1 | 1/2009 | Altberg et al. |
| 2009/0079816 A1 | 3/2009 | Qvarfordt et al. |
| 2009/0089364 A1 | 4/2009 | Ii et al. |
| 2009/0089685 A1 | 4/2009 | Mordecai et al. |
| 2009/0112997 A1 | 4/2009 | Carey et al. |
| 2009/0113066 A1 | 4/2009 | Wie et al. |
| 2009/0113314 A1 | 4/2009 | Dawson et al. |
| 2009/0128567 A1 | 5/2009 | Shuster et al. |
| 2009/0132943 A1 | 5/2009 | Minsky et al. |
| 2009/0193077 A1 | 7/2009 | Horii et al. |
| 2009/0247196 A1 | 10/2009 | Kim et al. |
| 2009/0254843 A1 | 10/2009 | Wie et al. |
| 2009/0259948 A1 | 10/2009 | Ii et al. |
| 2009/0286605 A1 | 11/2009 | Rick et al. |
| 2009/0288007 A1* | 11/2009 | Leacock .................. G06Q 10/10 715/757 |
| 2009/0300521 A1 | 12/2009 | Jerrard-Dunne et al. |
| 2009/0307620 A1 | 12/2009 | Rick et al. |
| 2010/0058202 A1 | 3/2010 | Rostom |
| 2010/0077034 A1 | 3/2010 | Alkov et al. |
| 2010/0146085 A1 | 6/2010 | Wie et al. |
| 2010/0146118 A1 | 6/2010 | Wie |
| 2010/0169801 A1 | 7/2010 | Blattner et al. |
| 2010/0211880 A1 | 8/2010 | Haggar et al. |
| 2010/0221693 A1 | 9/2010 | Gupta |
| 2010/0228547 A1 | 9/2010 | Scott et al. |
| 2010/0246587 A1 | 9/2010 | Schutz et al. |
| 2010/0257450 A1* | 10/2010 | Go .................. G06F 3/0481 715/733 |
| 2010/0274848 A1 | 10/2010 | Altmaier et al. |
| 2010/0287274 A1 | 11/2010 | Martinez et al. |
| 2010/0299433 A1 | 11/2010 | Boer et al. |
| 2011/0029898 A1 | 2/2011 | Malik |
| 2011/0029907 A1 | 2/2011 | Bakhash |
| 2011/0099218 A1 | 4/2011 | Schwartz |
| 2011/0169927 A1 | 7/2011 | Mages et al. |
| 2011/0196930 A1 | 8/2011 | Chawla et al. |
| 2011/0231781 A1 | 9/2011 | Betzler et al. |
| 2011/0274104 A1 | 11/2011 | Cozzi et al. |
| 2011/0302509 A1 | 12/2011 | Leacock et al. |
| 2012/0066306 A1 | 3/2012 | Leacock et al. |
| 2012/0179672 A1 | 7/2012 | Wie et al. |
| 2012/0209933 A1 | 8/2012 | Ridges et al. |
| 2012/0216131 A1 | 8/2012 | Moyers et al. |
| 2012/0246582 A1 | 9/2012 | Leacock et al. |
| 2012/0254858 A1* | 10/2012 | Moyers .................. H04L 51/04 717/177 |
| 2012/0331472 A1 | 12/2012 | Moon et al. |
| 2013/0073978 A1 | 3/2013 | Butler et al. |
| 2013/0109418 A1 | 5/2013 | Lazaridis et al. |
| 2013/0124712 A1 | 5/2013 | Parker |
| 2014/0129644 A1 | 5/2014 | Mohan et al. |
| 2014/0213309 A1 | 7/2014 | Lazaridis et al. |
| 2014/0237393 A1 | 8/2014 | Wie et al. |
| 2014/0289381 A1 | 9/2014 | Morton et al. |
| 2014/0297811 A1 | 10/2014 | Stevens et al. |
| 2015/0029865 A1 | 1/2015 | Drobinsky et al. |
| 2016/0234073 A1 | 8/2016 | Maes |
| 2017/0024259 A1 | 1/2017 | Mecklin et al. |

FOREIGN PATENT DOCUMENTS

| | | |
|---|---|---|
| CN | 101499080 A | 8/2009 |
| JP | 2002123479 | 4/2002 |
| JP | 2002149580 | 5/2002 |
| JP | 2002224447 | 8/2002 |
| JP | 2003067317 | 3/2003 |
| JP | 2005182331 A | 7/2005 |
| JP | 2005286749 A | 10/2005 |
| JP | 2007506309 A | 3/2007 |
| JP | 2007184871 A | 7/2007 |
| JP | 2007251380 A | 9/2007 |
| JP | 2008182670 A | 8/2008 |
| JP | 2010535363 A | 11/2010 |
| KR | 1020060060788 A | 6/2006 |
| KR | 1020090016692 A | 2/2009 |
| WO | 03015057 A1 | 2/2003 |
| WO | 2008106196 A1 | 9/2008 |
| WO | 2009000028 A1 | 12/2008 |

OTHER PUBLICATIONS

International Search Report and Written Opinion issued in counterpart International Application No. PCT/US2012/030766 (dated Oct. 19, 2012).

Search report and written opinion dated Aug. 13, 2010, in counterpart PCT Application No. PCT/US2010/020596.

Office action issued in European Patent Application No. 11818613.9 dated Mar. 21, 2016.

Machine English Translation of Japanese Laid-open Patent Publication No. 2005-286749.

Final Rejection dated Feb. 4, 2016 in U.S. Appl. No. 14/251,505, filed Apr. 11, 2014.

Amendment dated Nov. 18, 2015 in U.S. Appl. No. 14/251,505, filed Apr. 11, 2014.

Non-Final Rejection dated Aug. 14, 2015 in U.S. Appl. No. 14/251,505, filed Apr. 11, 2014.

* cited by examiner

LOCATING COMMUNICANTS IN A MULTI-LOCATION VIRTUAL COMMUNICATIONS ENVIRONMENT

CROSS-REFERENCE TO RELATED APPLICATIONS

This application is a continuation of Application Ser. No. 13/487,159, filed Jun. 2, 2012, which is a continuation-in-part of application Ser. No. 13/209,812, filed Aug. 15, 2011, which claims the benefit of Provisional Application No. 61/373,914, filed Aug. 16, 2010, Application Ser. No. 13/209,812 is a continuation-in-part of application Ser. No. 12/354,709, filed Jan. 15, 2009, which claims the benefit of Application No. 61/042,714, filed Apr. 5, 2008, and application Ser. No. 13/209,812 is a continuation-in-part of application Ser. No. 12/418,243, filed Apr. 3, 2009, which claims the benefit of Provisional Application No. 61/042,714, filed Apr. 5, 2008. This application is a continuation-in-part of application Ser. No. 12/354,709, filed Jan. 15, 2009, which claims the benefit of Application No. 61/042,714, filed Apr. 5, 2008. This application is a continuation-in-part of application Ser. No. 13/422,757, filed Mar. 16, 2012, which is a continuation of application Ser. No. 12/418,243, filed Apr. 3, 2009, which claims the benefit of Provisional Application No. 61/042,714, filed Apr. 5, 2008.

The entirety of each of application Ser. No. 13/209,812, filed Aug. 15, 2011, application Ser. No. 12/354,709, filed Jan. 15, 2009, and application Ser. No. 13/422,757, filed Mar. 16, 2012, is incorporated herein by reference.

This application also relates to the following patent applications, the entirety of each of which is incorporated herein by reference:

U.S. application Ser. No. 12/509,658, filed Jul. 27, 2009;
U.S. application Ser. No. 12/630,973, filed Dec. 4, 2009;
U.S. application Ser. No. 12/631,026, filed Dec. 4, 2009;
U.S. application Ser. No. 12/818,517, filed Jun. 18, 2010;
U.S. application Ser. No. 12/825,512, filed Jun. 29, 2010;
U.S. application Ser. No. 12/855,210, filed Aug. 12, 2010;
U.S. application Ser. No. 13/209,812, filed Aug. 15, 2011;
U.S. application Ser. No. 13/229,349, filed Sep. 9, 2011;
U.S. application Ser. No. 13/432,837, filed Mar. 28, 2012;
U.S. Provisional Patent Application No. 61/535,910, filed Sep. 16, 2011;
U.S. Provisional Patent Application No. 61/563,088, filed Nov. 23, 2011; and
U.S. Provisional Patent Application No. 61/603,024, filed Feb. 24, 2012.

BACKGROUND

When face-to-face communications are not practical, people often rely on one or more technological solutions to meet their communications needs. Traditional telephony systems enable voice communications between callers. Instant messaging (also referred to as "chat") communications systems enable users to communicate text messages in real time through instant message computer clients that are interconnected by an instant message server. Some instant messaging systems and interactive virtual reality communications systems allow users to be represented by user-controllable graphical objects (referred to as "avatars"). What are needed are improved systems and methods for realtime network communications.

DETAILED DESCRIPTION

Figure 1:
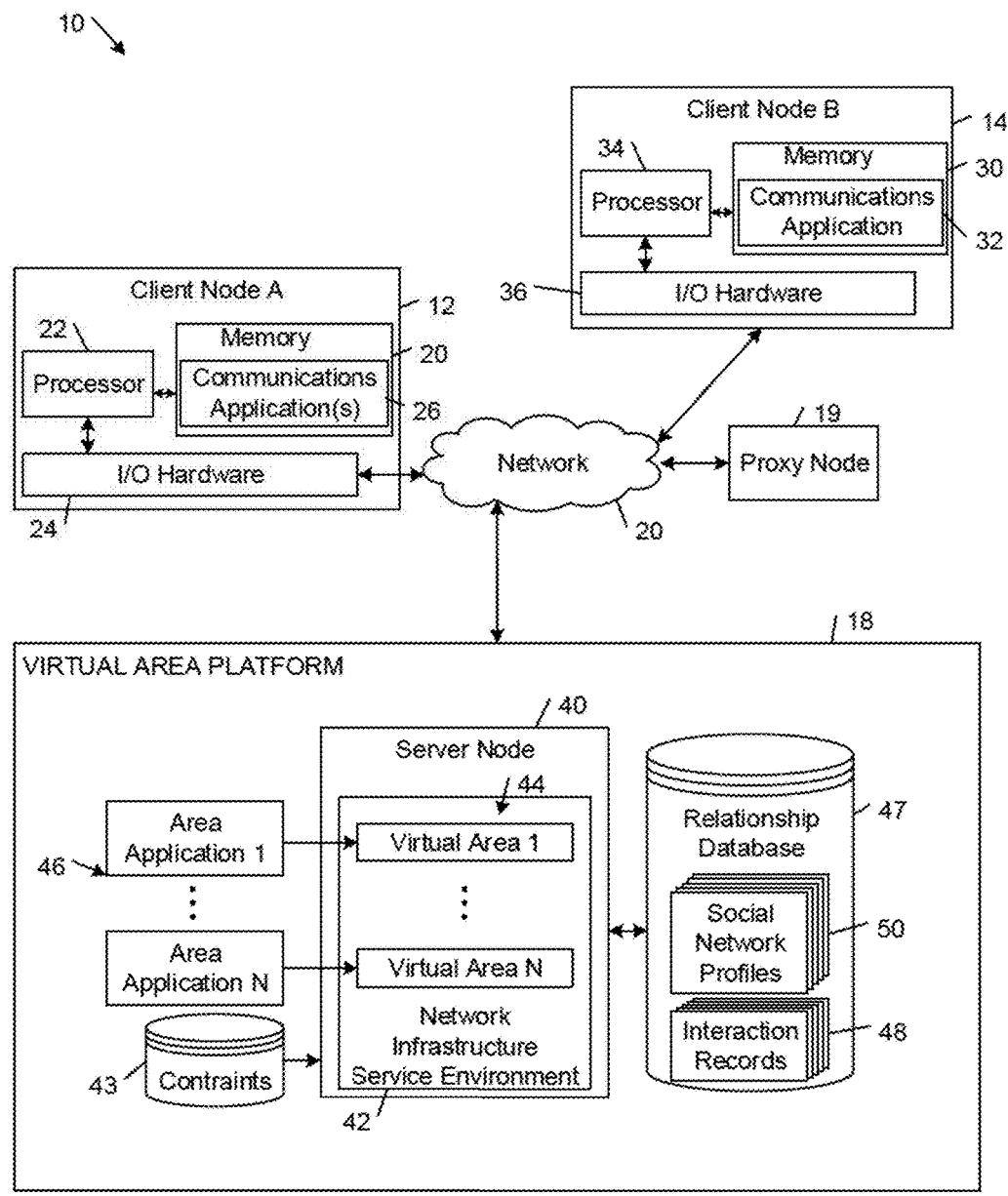
FIG. 1 is a diagrammatic view of an example of a network communications environment.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Definition of Terms

A "communicant" is a person who communicates or otherwise interacts with other persons over one or more network connections, where the communication or interaction may or may not occur in the context of a virtual area. A "user" is a communicant who is operating a particular network node that defines a particular perspective for descriptive purposes.

A "computer" is any machine, device, or apparatus that processes data according to computer-readable instructions that are stored on a computer-readable medium either temporarily or permanently. A "computer operating system" is a software component of a computer system that manages and coordinates the performance of tasks and the sharing of computing and hardware resources. A "software application" (also referred to as software, an application, computer software, a computer application, a program, and a computer program) is a set of instructions that a computer can interpret and execute to perform one or more specific tasks. A "data file" is a block of information that durably stores data for use by a software application.

The term "computer-readable medium" refers to any tangible, non-transitory medium capable storing information (e.g., instructions and data) that is readable by a machine (e.g., a computer). Storage devices suitable for tangibly embodying such information include, but are not limited to, all forms of physical, non-transitory computer-readable memory, including, for example, semiconductor memory devices, such as random access memory (RAM), EPROM, EEPROM, and Flash memory devices, magnetic disks such as internal hard disks and removable hard disks, magneto-optical disks, DVD-ROM/RAM, and CD-ROM/RAM.

A "data sink" (referred to herein simply as a "sink") is any of a device (e.g., a computer), part of a device, or software that receives data.

A "data source" (referred to herein simply as a "source") is any of a device (e.g., a computer), part of a device, or software that originates data.

A "network node" (also referred to simply as a "node") is a junction or connection point in a communications network. Examples of network nodes include, but are not limited to, a terminal, a computer, and a network switch. A "server" network node is a host computer on a network that responds to requests for information or service. A "client network node" is a computer on a network that requests information or service from a server.

A Uniform Resource Identifier (URI) is a string of characters that identifies a network resource.

A "network resource" is anything that can be identified by a uniform resource identifier (URI) and accessed over a network, including an electronic document, an image, a source of information, a service, operators and operands of a mathematical equation, classes, properties, numeric values, and a collection of other resources.

A "network connection" is a link between two communicating network nodes. A "connection handle" is a pointer or identifier (e.g., a uniform resource identifier (URI)) that can be used to establish a network connection with a network resource. A "network communication" can include any type of information (e.g., text, voice, audio, video, electronic mail message, data file, motion data stream, and data packet) that is transmitted or otherwise conveyed from one network node to another network node over a network connection.

A "communicant interaction" is any type of direct or indirect action or influence between a communicant and another network entity, which may include for example another communicant, a virtual area, or a network service. Examples of types of communicant interactions include communicants communicating with each other in realtime, a communicant entering a virtual area, and a communicant requesting access to a resource from a network service.

"Presence" refers to the ability and willingness of a networked entity (e.g., a communicant, service, or device) to communicate, where such willingness affects the ability to detect and obtain information about the state of the entity on a network and the ability to connect to the entity.

A "realtime data stream" is data that is structured and processed in a continuous flow and is designed to be received with no delay or only imperceptible delay. Realtime data streams include digital representations of voice, video, user movements, facial expressions and other physical phenomena, as well as data within the computing environment that may benefit from rapid transmission, rapid execution, or both rapid transmission and rapid execution, including for example, avatar movement instructions, text chat, realtime data feeds (e.g., sensor data, machine control instructions, transaction streams and stock quote information feeds), screen shares, and file transfers.

A "virtual area" (also referred to as an "area," a "place," or a "space") is a representation of a computer-managed space or scene. Virtual areas typically are one-dimensional, two-dimensional, or three-dimensional representations; although in some examples a virtual area may correspond to a single point. Oftentimes, a virtual area is designed to simulate a physical, real-world space. For example, using a traditional computer monitor, a virtual area may be visualized as a two-dimensional graphic of a three-dimensional computer-generated space. However, virtual areas do not require an associated visualization. A virtual area typically refers to an instance of a virtual area schema, where the schema defines the structure and contents of a virtual area in terms of variables and the instance defines the structure and contents of a virtual area in terms of values that have been resolved from a particular context.

A "position" in a virtual area refers to a location of a point or an area or a volume in the virtual area. A point typically is represented by a single set of one-dimensional, two-dimensional, or three-dimensional coordinates (e.g., x, y, z) that define a spot in the virtual area. An area typically is represented by the three-dimensional coordinates of three or more coplanar vertices that define a boundary of a closed two-dimensional shape in the virtual area. A volume typically is represented by the three-dimensional coordinates of four or more non-coplanar vertices that define a closed boundary of a three-dimensional shape in the virtual area.

"Navigating" in the context of a virtual area means moving or changing an attentional focus or state of a user or another communicant with respect to the virtual area. For example, a user may navigate his or her attention from one virtual communication context to another (e.g., from one zone of a virtual area to another or from one virtual area to another). A user also may navigate his or her presence or the presence of another communicant from one virtual communication context to another (e.g., from one zone of a virtual area to another or from one virtual area to another).

As used herein, the term "includes" means includes but not limited to, the term "including" means including but not limited to. The term "based on" means based at least in part on.

II. Interfacing with a Spatial Virtual Communications Environment

The examples that are described herein provide systems and methods for providing realtime visualizations of communicants' realtime availabilities and activities across different virtual area based communication contexts. The realtime visualizations enable the communicant to make more informed network interaction decisions (e.g., when to interact with a contact) and encourage users to initiate interactions with other communicants and to join contexts (e.g., an ongoing conversation between communicants) of which users otherwise would not have been aware. Some examples also apply a spatial metaphor that provides a context for organizing the presentation of various interface elements that are used by communicants to participate in realtime networked communications.

FIG. 1 shows an example of a network communications environment 10 that includes a first client network node 12 (Client Node A), a second client network node 14 (Client Network Node B), a virtual area platform 18 and an optional proxy node 19 that are interconnected by a network 20. The network 20 may include one or more of any of a local area network (LAN), a metropolitan area network (MAN), and a wide area network (WAN) (e.g., the internet). The network 20 typically includes a number of different computing platforms and transport facilities that support the transmission of a wide variety of different media types (e.g., text, voice, audio, video, and other data) between network nodes.

The first client network node 12 includes a computer-readable medium 22 (or "memory"), a processor 24, and input/output (I/O) hardware 26 (including, e.g., a display and network communication hardware). The processor 24 executes at least one virtual area communications application 26 that is stored in the memory 22. The second client network node 14 typically is configured in substantially the same general way as the first client network node 12, with a computer-readable medium 30 storing at least one virtual area communications application 32, a processor 34, and I/O hardware 36.

Each of the network nodes 12, 14 has a respective set of one or more sources and an exemplary set of one or more sinks. Each source is a device or component that originates data of a particular data stream content type and each sink is a device or component that receives data of a particular data stream content type. A source and a sink of the same data stream content type are referred to herein as being "complementary." Exemplary sources include an audio source (e.g., an audio capture device, such as a microphone), a video source (e.g., a video capture device, such as a video camera), a chat source (e.g., a text capture device, such as a keyboard), a motion data source (e.g., a pointing device, such as a computer mouse), and other sources (e.g., file sharing source or a source of a customized real-time data stream). Exemplary sinks include an audio sink (e.g., an audio rendering device, such as a speaker or headphones), a video sink (e.g., a video rendering device, such as a display monitor), a chat sink (e.g., a text rendering device, such as a display monitor), a motion data sink (e.g., a movement rendering device, such as a display monitor), and other sinks (e.g., a printer for printing shared files, a device for rendering real-time data streams different from those already described, or software that processes real-time streams for analysis or customized display). Each source has an active state in which the source is available for originating data and an inactive state in which the source is not available for originating data. Likewise, each sink has an active state in which the sink is available for receiving data and an inactive state in which the sink is not available for receiving data. The communicants operating the client nodes 12, 14 typically can control the states of the sources and sinks using controls provided by the communications applications 26, 32. For example, in some examples, the communications applications 26, 32 provide user controls for turning on/off the local microphones and the local speakers (e.g., headsets) on the client network nodes 12, 14.

The virtual area platform 18 includes at least one server network node 40 that provides a network infrastructure service environment 42 that manages sessions of the first and second client nodes 12, 14 in one or more virtual areas 44 in accordance with respective virtual area applications 46. One or more of the virtual area applications 44 typically are synchronous conferencing applications that support one or more types of communications between the client nodes 12, 14 (e.g., text chat, audio conferencing, video conferencing, application sharing, and file sharing). The network infrastructure service environment 42 typically includes one or more network infrastructure services that cooperate with the communications applications 26, 32 in the process of establishing and administering network connections between the client nodes 12, 14 and other network nodes. Among the network infrastructure services that are included in the example of the network infrastructure service environment 42 are an account service, a security service, an area service, a rendezvous service, an interaction service, and a capabilities engine. The area service administers a virtual area 44 by managing sessions of the first and second client nodes 12, 14 in the virtual area 44 in accordance with the virtual area application 46. Examples of the virtual area platform 18 and the virtual area applications 46 are described in U.S. Provisional Patent Application No. 61/563,088, filed Nov. 23, 2011. Examples of an account service, a security service, an area service, a rendezvous service, and an interaction service are described in U.S. patent application Ser. No. 12/630,973, filed Dec. 4, 2009. Examples of a capabilities engine are described in U.S. Provisional Patent Application No. 61/535,910, filed Sep. 16, 2011.

The network infrastructure service environment 42 maintains a relationship database 47 that contains the records 48 of interactions between communicants and social network profiles 50 that are associated with respective communicants. Each interaction record describes the context of an interaction between a pair of communicants. Each social network profile 50 typically includes: identity characteristics (e.g., name, age, gender, and geographic location information such as postal mailing address) that describe a respective communicant or a persona that is assumed by the communicant; explicit relationship information that is declared by the communicant; and relationship information that is inferred from the communicant's interactions in the network communication environment 10. Additional details regarding the relationship database 47 and the search and retrieval functionalities associated with the relationship database as described in U.S. patent application Ser. No. 12/354,709, filed Jan. 15, 2009, U.S. patent application Ser. No. 12/418,243, filed Apr. 3, 2009, U.S. patent application Ser. No. 12/631,026, filed Dec. 4, 2009, and U.S. patent application Ser. No. 13/432,837, filed Mar. 28, 2012.

Some examples provide systems and methods for encapsulating assemblies (e.g., meetings, informal gatherings, and the like) of communicants in one or more virtual areas based on information obtained from the interactions records 48. These examples provide a wide variety of ways in which to capture features of ongoing and completed assemblies and visualize those features at different levels of detail. Exemplary visualizations include an activity view that shows a time-based visualization of assemblies within a particular domain, and a timeline view that shows a scalable visualization of a selected subset of the assemblies within a particular domain. The domain may be predefined or specified by a user and may be used to select the assemblies that are presented in the visualizations. The assemblies may be filtered according to a variety of different attributes of the assemblies, including by virtual location (e.g., a particular virtual area or a particular zone of a virtual area in which the assemblies occurred), by communicant (e.g., one or more communicants who participated in the assemblies), and by time (e.g., a period during which the assemblies started or ended). The assembly visualizations allow communicants to readily obtain a quick summary of the activities occurring in a particular context (e.g., one or more of time, virtual location, participants involved, and types of information shared). They also increase the availability of assembly related information (e.g., notes, shared files, recordings, follow-up tasks, comments and other feedback) by allowing communicants to see and retrieve the information associated with the assemblies in a variety of different ways. Examples of systems and methods of encapsulating and visualizing assemblies of communicants in virtual areas are described in U.S. patent application Ser. No. 13/432,837, filed Mar. 28, 2012.

The communications applications 26, 32, the area applications 46, and the network infrastructure service environment 42 together provide a platform that administers the realtime connections with network nodes in an instance of a virtual area subject to a set of constraints 43 (e.g., capabilities and other types of permissions, rules, and preferences). Each of the virtual area applications 46 is hosted by a respective one of the virtual areas 44 and includes a description of the respective virtual area 44. Communicants respectively operating the client nodes 12, 14 connect to the virtual areas 44 through the virtual area communications applications 26, 32.

The communications applications 26, 32 typically present respective views of the virtual areas 44 in accordance with data received from the network infrastructure service environment 42. The communications applications 26, 32 also provide respective interfaces (e.g., one or more of a voice input interface, and audio output interface, and a visual graphical user interface) for receiving commands from the communicants. In visual graphical user interfaces, communicants typically are represented in the virtual areas 44 by respective avatars (e.g., sprites). In audio output interfaces, communicants' states and activities are described using audio signals (e.g., synthesized speech). Communicant avatars typically move about the virtual areas 44 in response to commands that are input by the communicants at their respective network nodes. In some examples, the communications applications 26, 32 establish realtime data stream connections between the first and second client network nodes 12, 14 and other network nodes connected to the virtual area 44 based on the positions of the communicants' avatars in the virtual areas 44. In some examples, each of the client network nodes 12, 14 includes a respective realtime kernel of the type described in U.S. patent application Ser. No. 12/630,973, filed Dec. 4, 2009, which supports remote configuration of stream handlers for processing data streams (e.g., rendering audio and video data streams) on a client network node.

A virtual area 44 may correspond to an abstract (nongeometric) virtual area that is defined with respect to abstract coordinates, or a visual virtual area that is defined with respect to one-, two- or three-dimensional geometric coordinates. Abstract virtual areas may or may not be associated with respective visualizations, whereas visual virtual areas are associated with respective visualizations.

In some of the examples that are described herein, the virtual areas are visual virtual areas of the type disclosed in U.S. Pat. Nos. 7,769,806 and 7,844,724. These visual virtual areas include physical geometry and collision geometry. The physical geometry describes the shape of the virtual area. The physical geometry typically is formed from surfaces of triangles, quadrilaterals, or polygons. Colors and textures are mapped onto the physical geometry to create a more realistic appearance for the virtual area. Lighting effects may be painted onto the visual geometry and the texture, color, or intensity near the lighting effects may be modified. The collision geometry describes invisible surfaces that determine the ways in which objects can move in the virtual area. The collision geometry may coincide with the visual geometry, correspond to a simpler approximation of the visual geometry, or relate to application-specific requirements of a virtual area designer.

Some examples of the virtual area platform 18 enable software application designers to define the semantics of position in an abstract virtual area (e.g., a software application or a computer data file). Through associations with respective connection rules, these position definitions can be used, for example, to drive connections to virtual areas, entries into virtual areas, connections to communicants and other sources or sinks of realtime data streams, and determinations of presence data relating to communicants, network resources, and network services. Additional details regarding systems and methods of defining the semantics of position in abstract virtual areas are described in U.S. application Ser. No. 12/631,008, which was filed on Dec. 4, 2009.

A virtual area typically includes one or more zones. A zone may be a rendered spatial extent, a set of rules applied to a spatial extent, or both. Zones may be arranged hierarchically in a virtual area, with an outermost zone (referred to herein as the "Global Governance Zone") enclosing all other zones in the virtual area. Within the Global Governance Zone, there can be location zones (e.g., rooms of a virtual area) or smaller governance zones that enclose a group of location zones and provide regions of governance on the map. A zone definition typically also includes one or more channel definitions that describe how to create respective channels in the zone and specify the information about the channel that is published to a client network node that becomes present in the zone. A channel is always uniquely defined point-to-point and is unique to a virtual area application and a session between a client network node and the virtual area platform.

Examples of the types of rules that may be associated with a zone include switching rules, governance rules, and permission rules.

Switching rules govern realtime stream connections between network nodes that are linked to the virtual area (e.g., network nodes that are associated with objects, such as avatars, in the virtual area). The switching rules typically include a description of conditions for connecting sources and sinks of realtime data streams in terms of positions in the virtual area. Each switching rule typically includes attributes that define the realtime data stream type to which the rule applies and the location or locations in the virtual area where the rule applies. In some examples, each of the rules optionally may include one or more attributes that specify a required role of the source, a required role of the sink, a priority level of the stream, and a requested data routing topology. In some examples, if there are no explicit switching rules defined for a particular part of the virtual area, one or more implicit or default switching rules may apply to that part of the virtual area. One exemplary default switching rule is a rule that connects every source to every compatible sink within an area, subject to policy rules. Policy rules may apply globally to all connections between the area clients or only to respective connections with individual area clients. An example of a policy rule is a proximity policy rule that only allows connections of sources with compatible sinks that are associated with respective objects that are within a prescribed distance (or radius) of each other in the virtual area. The network connections between network nodes may be arranged in a variety of different data routing topologies, including a peer-to-peer topology, a mediated topology (i.e., a topology in which connections between network nodes are mediated by another network node, such as a server network node, a client network node, or a network switch), and hybrid architectures that combine aspects of peer-to-peer and mediated architectures. In some examples, the switching rules dictate how local connection processes executing on each of the network nodes establishes communications with the other network nodes based on the locations of the associated objects in the zones of the virtual area. A switching rule also may define a direct connection between network nodes or an indirect connection through an intermediate network node (e.g., the proxy node 19 shown in FIG. 1).

Governance rules control who has access to resources (e.g., the virtual area itself, regions with the virtual area, and objects within the virtual area), who has access to data (e.g., data streams and other content) that is associated with the virtual area, what is the scope of that access to the data associated the virtual area (e.g., what can a user do with the data), and what are the follow-on consequences of accessing that data (e.g., record keeping, such as audit logs, and payment requirements). In some examples, an entire virtual area or a zone of the virtual area is associated with a "governance mesh" that enables a software application developer to associate governance rules with a virtual area or a zone of a virtual area. This avoids the need for the creation of individual permissions for every file in a virtual area and avoids the need to deal with the complexity that potentially could arise when there is a need to treat the same document differently depending on the context.

A permission rule defines a respective capability requirement (e.g., for a respective action, behavior, or state) in terms of one or more capabilities, attributes, and settings, which may be persistent or transient. Examples of permission rules include: a rule that conditions a communicant's ability to enter a target zone on the communicant having a CanEnterZone capability for the target zone; a rule that conditions the ability of a grantee communicant to open a target door of a target room on the grantee communicant having a CanOpenDoor capability for the target room; and a rule that conditions the transmission of a message describing the state of a particular communicant's avatar in a zone to a recipient having a CanSeeState capability for the particular communicant in the zone. A capability provides permission for a client to perform some action within the application. For example, a client may be granted the capability "CanEnterZone" for a specific zone within a virtual area that has been defined with that capability requirement. The client that has the capability can enter the zone, whereas a client without the capability would have their RDS state change rejected when they tried to enter the zone. Examples of capabilities systems for administering permission rules are described in U.S. Provisional Patent Application No. 61/535,910, filed Sep. 16, 2011.

As explained above, the zones of a virtual area can be associated with respective switching rules, each of which instructs the area service to connect sources of a respective data stream type that are associated with a designated source zone with sinks of the respective realtime data stream type that are associated with a designated sink zone. Network nodes can establish respective presences in the zones of a virtual area. In some examples, network nodes associated with respective objects (e.g., avatars representing the communicants operating the network nodes) that can be moved to different locations in the virtual area, and the network nodes are present in the zones in which the associated objects are located. The area service administers data stream connections between the network nodes based on the switching rules, the respective sources and sinks associated with the network nodes, and the respective zones of the virtual area in which the objects are located.

The virtual area platform 18 enables a wide variety of highly customizable virtual area applications to be created. Examples of such applications include virtual area applications for creating a virtual office, a virtual personal space, a virtual art gallery, a virtual concert hall, a virtual auditorium, a virtual conference room, and a virtual clubhouse. The virtual area platform 18 supports the creation of network connections between network nodes in the same zone of a virtual area, as well as the creation of one-way or two-way data stream connections between network nodes in different zones.

A virtual area typically is associated with a specific set of communicants (e.g., members of the virtual area) and a plurality of persistent zones that define respective sub-contexts within the virtual area. Each zone of a virtual area may support an independent communication session between the network nodes in the zone. For example, a virtual area may include zones in which audio, video, and text chat channel connections are established only between the sources and sinks of network nodes that are in the same zone. In addition, one or more attributes or other data (e.g., a name, a designated purpose, membership, or associated history of interaction in the zone) may be associated with a virtual area zone to define a specific persistent virtual communication context that represents a particular persistent communication opportunity within the virtual area for organizing a communicant's communications with others. In some examples, the visual and audio interfaces that are provided on the client network nodes are configured to present all the independent communication sessions that are occurring in the virtual area. This allows a user to visualize (through sight or imagination) multiple concurrent independent communication interactions and thereby quickly learn who is meeting with whom and the contexts of those meetings (as defined by the zones in which the meetings are occurring).

Figure 2:
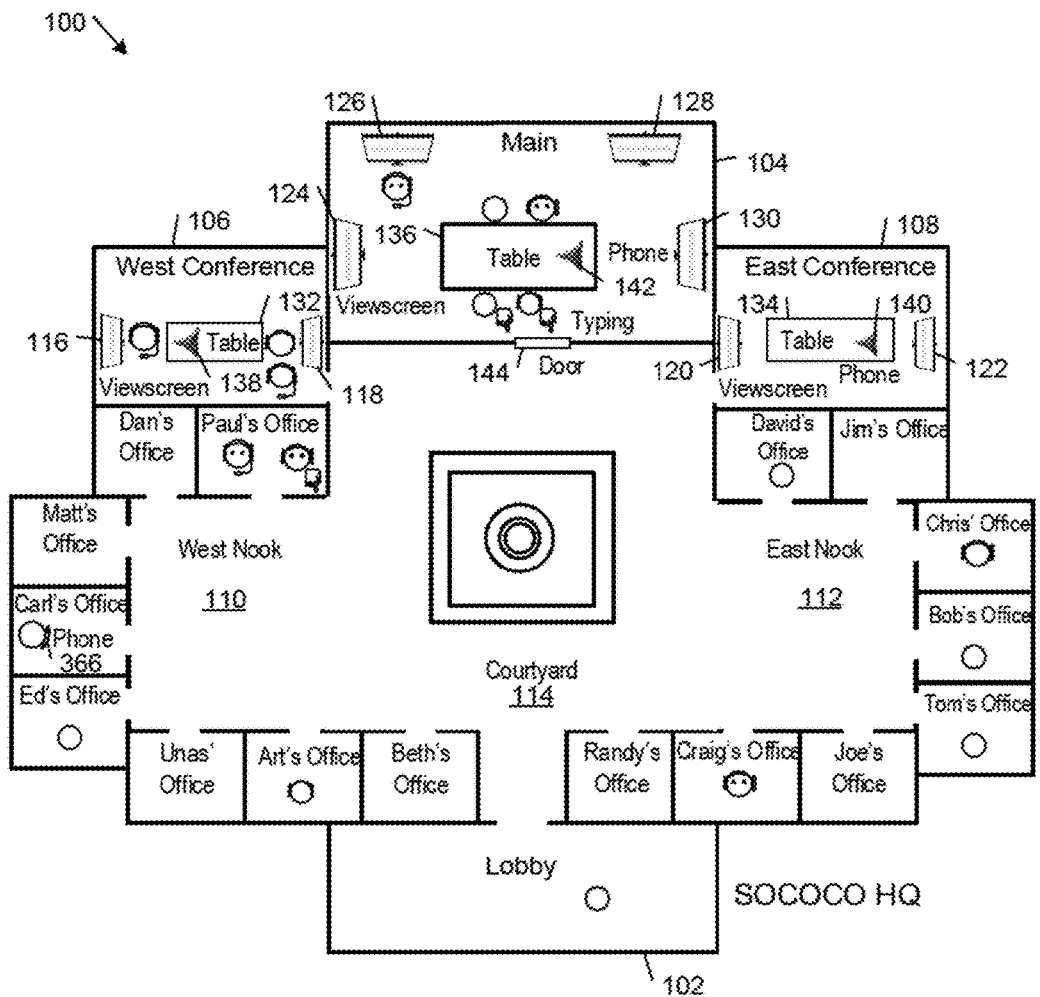
FIG. 2 is a diagrammatic view of an example of a graphical user interface.

FIG. 2 shows an example of a two-dimensional visualization of a virtual area 100 (i.e., the SOCOCO HQ virtual area). The SOCOCO HQ virtual area 100 includes a lobby 102, a Main conference room 104, a West Conference room 106, an East Conference room 108, a West Nook zone 110, an East Nook zone 112, a Courtyard zone 114, and sixteen offices. Each of the conference rooms 104-108 includes respective viewscreen objects 116-130, table objects 132-136, and respective telephone objects 138-142 and supports realtime audio, chat, and application and network resource sharing communications between the network nodes in the same conference room. Each of the offices includes respective viewscreen objects (not shown) and a respective telephony object (not shown) and supports realtime audio, chat, and application and network resource sharing communications between the network nodes in the same office. Each of the telephony objects supports shared dial-in and dial-out telephony communications as described in U.S. patent application Ser. No. 13/165,729, filed Jun. 21, 2011. Each of the West Nook 110, East Nook 112, and Lobby 102 zones respectively supports realtime audio and chat communications between the network nodes in the same zone. The communication properties of an example of the virtual area 100 are described in U.S. Provisional Patent Application No. 61/603,024, filed Feb. 24, 2012.

Each of the lobby, the conference rooms, and the offices includes a respective door object, which may be in either an open state or a closed state. The area service allows switching rule specified connections to be established through a door object that is in an open state, whereas the area service prevents such connections from being established through a door object that is in a closed state. In the state shown in FIG. 2, the door 144 of the Main conference room currently is closed, whereas all the other doors in the SOCOCO HQ virtual area 100 currently are open. In some examples, the door objects correspond to the door objects described in U.S. Provisional Patent Application No. 61/535,910, filed Sep. 16, 2011.

Figure 3:
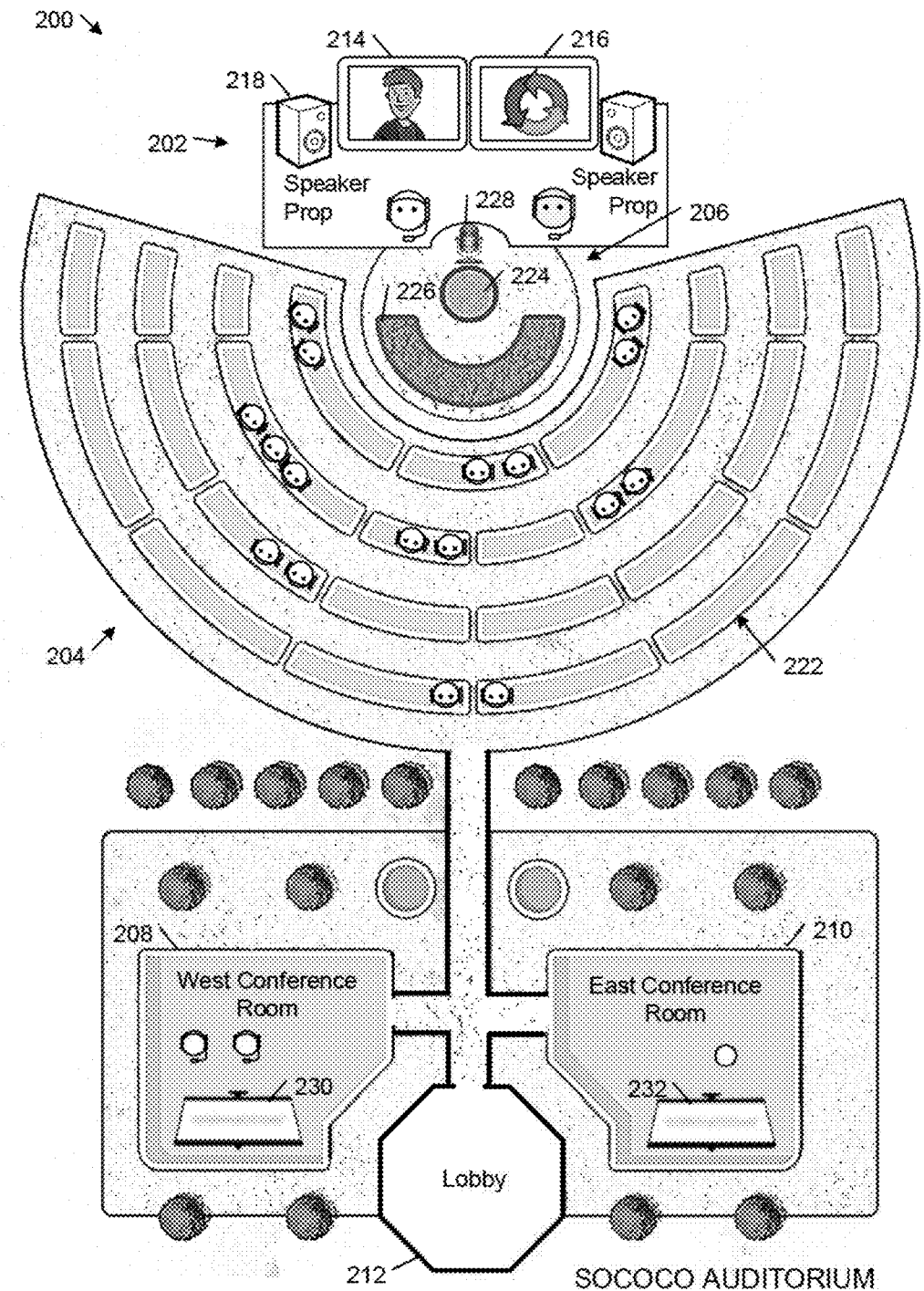
FIG. 3 is a diagrammatic view of an example of a graphical user interface.

FIG. 3 shows an example of a virtual area 200 (i.e., the SOCOCO Auditorium virtual area) that includes zones and is associated with a visualization of an auditorium. The virtual area 200 includes a stage (or podium) zone 202, a general seating zone 204, a question-and-answer zone 206, a West Conference Room 208, an East Conference Room 210, and a Lobby 212. The stage zone 202 includes viewscreen objects 214, 216 and speaker props 218, 220. The general seating zone 204 includes a plurality of sub-zones 222 (referred to herein as "bench zones") defining locations where network nodes are permitted to be present in the general seating zone 204. The question-and-answer zone 206 includes a microphone sub-zone 224, a queuing sub-zone 226, and a microphone prop 228. Each of the West Conference Room 208 and the East Conference Room 210 includes a respective viewscreen object 230, 232. The communication properties of an example of the virtual area 200 are described in U.S. Provisional Patent Application No. 61/603,024, filed Feb. 24, 2012.

Figure 4:
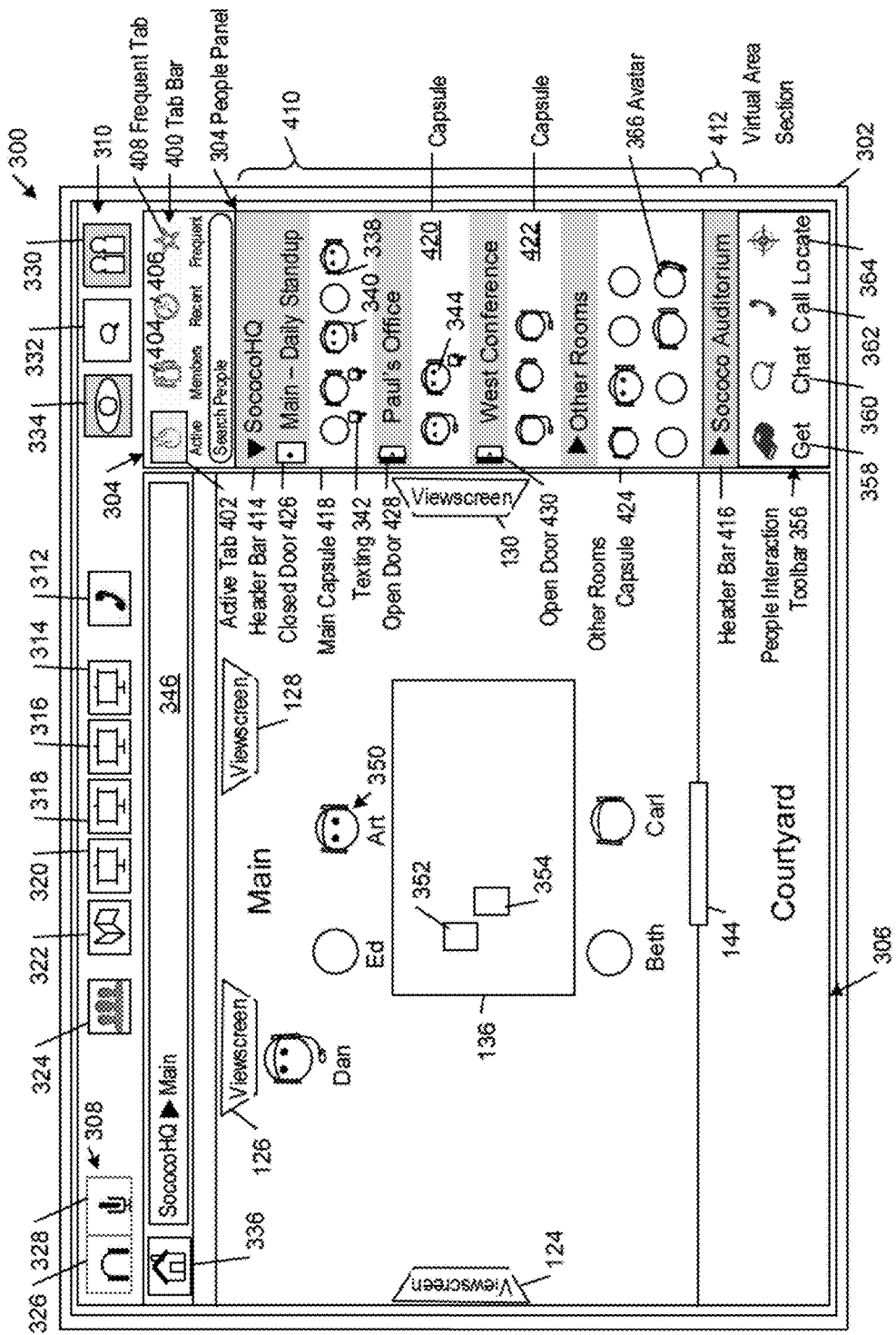
FIG. 4 is a diagrammatic view of an example of a graphical user interface.

FIG. 4 shows an exemplary graphical user interface 300 that is generated by an example of the communications application 26 in a window 302 on a display of the client network node from which a user of the client application ("Art" in this example) is operating. The graphical user interface 300 includes a people panel 304, a viewer panel 306, an audio interaction toolbar 308, a set of panel view controls 310, a Phone button 312, a respective View Screen button 314-320 for each viewscreen 1240130 in the current zone of presence, a Map button 322, and a meeting button 324.

The audio interaction toolbar 308 includes a headphone control 326 that enables Art to toggle on and off the local speakers of the client network node, and a microphone control 328 that enables Art to toggle on and off the local microphone of the client network node.

The panel view controls 310 include a people panel button 330 for opening and closing the people panel 304, a chat panel button 332 for opening and closing a chat panel, and a viewer panel button 334 for opening and closing the viewer panel 306.

The Phone button 312 is associated with telephony related functionality of the platform that enables a user of a Public Switched Telephone Network (PSTN) terminal device to participate in virtual area based communications (e.g., by the PSTN terminal device user calling into a zone of the virtual area or by a user of the communications application 26 to call out to the PSTN terminal device user), as described in U.S. patent application Ser. No. 13/165,729, filed Jun. 21, 2011.

Each of the View Screen buttons 314-320 sets the viewer panel 306 to display the content the content being shared in connection with a corresponding one of the viewscreen objects in the current zone of presence or, if no content is being shared in connection with the current viewscreen object, to display a Share button that allows the user to initiate a screen sharing session in connection with the selected view screen object.

The Map button 322 sets the view presented in the viewer panel 306 to a map view of the virtual area.

The Meeting button 324 sets the view presented in the viewer panel 306 to a meeting user interface for visualizing assemblies of communicants in the virtual area, as described in U.S. patent application Ser. No. 13/432,837, filed Mar. 28, 2012.

The graphical user interface 300 also includes a home button 336 that is associated with a control that returns the user's presence to a designated "home" location in the virtual environment (e.g., a designed zone, such as a personal zone or other office that is assigned to the user). Additional details regarding the structure, function, and operation of examples of the navigation controls are described in U.S. patent application Ser. No. 12/354,709, filed Jan. 15, 2009.

In the people and viewer panels 304, 306 of the graphical user interface 300, each communicant is represented graphically by a respective circular sprite (or avatar) that is associated with a respective user name of the communicant (i.e., "Art," "Beth," "Carl," "Dan," "Ed," "Fran," and "Garth") and an optional status line that includes additional information about the communicant, such as location of presence (e.g., a virtual area application or a zone of that sever application); availability (e.g., busy, idle), a status message (e.g., "Out of the office next Wednesday"), and the name of the client node from which the communicant is operating (e.g., "workstation 1" or "mobile phone"). In the map views shown in the viewer panel 304, the spatial positions of the communicant sprites in the respective virtual area zones may be ordered alphabetically by user name or temporally by the times when the communicants established their respective presences in the respective virtual area zones.

The area service monitors the activities on various communication channels over which the respective communicants are configured to communicate in the virtual areas and generates state data that indicate state information about the communicants and real-time data streams (RDS) that indicate the current realtime activities of the communicants. These states and activities are represented in the graphical user interface 300 by visual cues that are depicted in association with the graphical representations of the communicants in the people panel 304 and the map views shown in the viewer panel 306. For example, the "on" or "off" state of a communicant's local speaker channel is depicted by the presence or absence of a headphones graphic 338 on the communicant's sprite. When a communicant's speakers are on, the headphones graphic 338 is present (see sprites Art, Carl, and Dan) and, when a communicant's speakers are off, the headphones graphic 338 is absent (see sprites Beth and Ed). The "on" or "off" state of the communicant's microphone is depicted by the presence or absence of a microphone graphic 340 on the communicant's sprite. When a communicant's microphone is on, the microphone graphic 340 is present (see sprite Dan); and, when a communicant's microphone is off, the microphone graphic 340 is absent (see sprites Art, Beth, Carl, and Ed). The headphones graphic 338 and the microphone graphic 340 provide visual cues of the on or off states of the communicant's sound playback and microphone devices. In addition, the current activity state of a communicant's microphone channel is indicated by a dynamic visualization that lightens and darkens the communicant's avatar in realtime to reflect the presence or absence of audio data on the microphone channel. Thus, whether or not their local speakers are turned on, communicants can determine when another communicant is speaking by the "blinking" of the coloration of that communicant's avatar. The activity state of a communicant's text chat channel is depicted by the presence or absence of the hand graphic 342 adjacent the communicant's sprite (see sprite Beth). Thus, when a communicant is transmitting text chat data to another network node the hand graphic 342 is present, and when a communicant is not transmitting text chat data the hand graphic 342 is not present. In some examples, the text chat RDS data reflects when keyboard keys are depressed such that the visualization of the communicant's text channel appears as a flashing on and off of the hand graphic 342. In addition, the avatars of communicants who are viewing a shared application in connection with viewscreen props (discussed below) are depicted with a pair of "eyes" 344 to indicate that the represented communicants are viewing the content being shared in connection with the viewscreen props (see, e.g., the avatars of Art and Dan in the Main zone shown in the viewer panel 306 in FIG. 4).

Members of a virtual area are able to receive the state and RDS information for the communicants in the user's virtual areas of membership whether or not the user is present in the virtual area. For example, the graphical user interface 300 that is presented to Art shows visual cues indicating the states and communication channel activities of the communicants who are present in the SOCOCO HQ virtual area 100 (where Art is present) and the states and communication channel activities of the communicants who are present in other areas of which Art is a member but not currently present (e.g., the SOCOCO Auditorium virtual area 200).

In the example shown in FIG. 4, the viewer panel 306 is in the Map view mode, which presents a rendered spatial view of the user's current zone of presence of the SOCOCO HQ virtual area (i.e., SococoHQ/Main as shown in the location bar 346, which indicates that Main is a zone within the virtual area SOCOCO HQ). Each of the communicants who is present in the virtual area is represented graphically in the viewer panel 306 by a respective avatar that corresponds to the communicant's avatar shown in the people panel 304. The virtual area is represented graphically by a two-dimensional top view of a rectangular space. In some examples, the communicants' sprites automatically are positioned in predetermined locations (or "seats") in the virtual area when the communicants initially enter the virtual area.

The Main zone includes four view screen props (or "objects") 124-130 and a table prop 136. Communicants interact with the props by selecting them with an input device (e.g., by single-clicking on the props with a computer mouse, touch pad, touch screen, or the like). The view screen props 124-130 are associated with application sharing functionality of the platform that enables communicants to share applications operating their respective client network nodes. The application sharing functionality is invoked by activating a view screen (e.g., by single-clicking the view screen object with an input device). In some embodiments, the platform provides visual cues that indicate whether or not a communicant is sharing an application over an application sharing channel. In response to a communicant's selection of the view screen prop, the communicant's sprite automatically is moved to a position in the graphical representation of the virtual area that is adjacent the view screen prop. The position of a communicant's sprite adjacent the view screen prop indicates that the communicant currently is sharing or is about to share an application with the other communicants in the virtual area. In addition, the avatar of each communicant who is viewing a shared application is depicted with a pair of "eyes" 130 to indicate that the represented communicants are viewing the content being shared in connection with the view screen props (see, e.g., the avatars of Art and Dan in FIG. 4). The graphical depiction of view screen prop is changed depending on whether or not an active application sharing session is occurring. For example, the depicted color of the view screen may change from a brighter color during an active application sharing session to a darker color when there is no application sharing taking place. Examples of the application sharing process are described in connection with FIGS. 26-28 of U.S. patent application Ser. No. 12/354,709, filed Jan. 15, 2009, and in U.S. patent application Ser. No. 12/418,270, filed Apr. 3, 2009.

In some examples, one or more of the viewscreen props 124-130 may be associated with respective uniform resource identifiers (URIs) of network resources to enable communicants to interact with and share information associated with the network resources via the application sharing (e.g., web browser sharing) functionality associated with the viewscreen objects as described in U.S. Provisional Patent Application No. 61/444,989, filed Feb. 21, 2011.

The table prop 136 is associated with file share functionality of the platform that enables communicants to upload computer data files to server storage in association with respective ones of the zones of the virtual area and to download data files that are associated with zones of the virtual area from the server storage to the respective client network nodes. In example shown in FIG. 4, there are two document objects 352, 354 that are associated with the table prop 136 in the Main zone 104 of the SOCOCO HQ virtual area. The document objects 352, 354 are linked to respective documents that are have been shared in the virtual area and stored in server storage with an index that refers to the unique identifier of the Main zone 104. Any of the document objects 352, 354 may be selected by a communicant (e.g., by double-clicking the document object with an input device, such as a computer mouse) to initiate downloading of the associated document to the communicant's client network node. Additional details regarding the structure, function, and operation of the table prop 136 may be obtained from U.S. patent application Ser. No. 12/354,709, filed Jan. 15, 2009.

The people panel 304 depicts the realtime availabilities and activities of communicants that are associated with Art (e.g., by being a contact of Art or being a member of or present in a virtual area of which Art is a member) across different communication contexts.

The people panel 304 includes a people interaction toolbar 356 that includes includes a Get button 358, a Chat button 360, a Call button 362, and a Locate button 364 that are associated with respective interaction functionalities of the platform that operate with respect to one or more communicants associated with user-selected ones of the avatars in the people panel 304.

Selection of the Get button 358 in connection with one or more user-selected avatars in the people panel 304 opens an invite window that enables the user to invite the communicants corresponding to the one or more selected avatars to a virtual area location (e.g., an area application or zone within that area application) designated by the user. Selection of the Chat button 360 in connection with a user-selected avatar in the people panel 304 opens a chat panel that enables the user to open a private peer-to-peer zone for text chatting with the communicant corresponding to the selected avatar. Additional details regarding embodiments of the methods and functions invoked by the Chat button 360 and the Get button 358 are described in U.S. patent application Ser. No. 12/354,709, filed Jan. 15, 2009, and U.S. patent application Ser. No. 13/209,812, filed Aug. 15, 2011.

Selection of the Call button 362 opens a call window that enables the user to place a telephone call to one or more communicants, as described in U.S. patent application Ser. No. 13/165,729, filed Jun. 21, 2011. The called communicants are represented in the graphical user interface 300 by avatars that are decorated with graphical representations of a telephone (see, e.g., the avatar 366 in the people panel 304 shown in FIG. 4).

Figure 5:
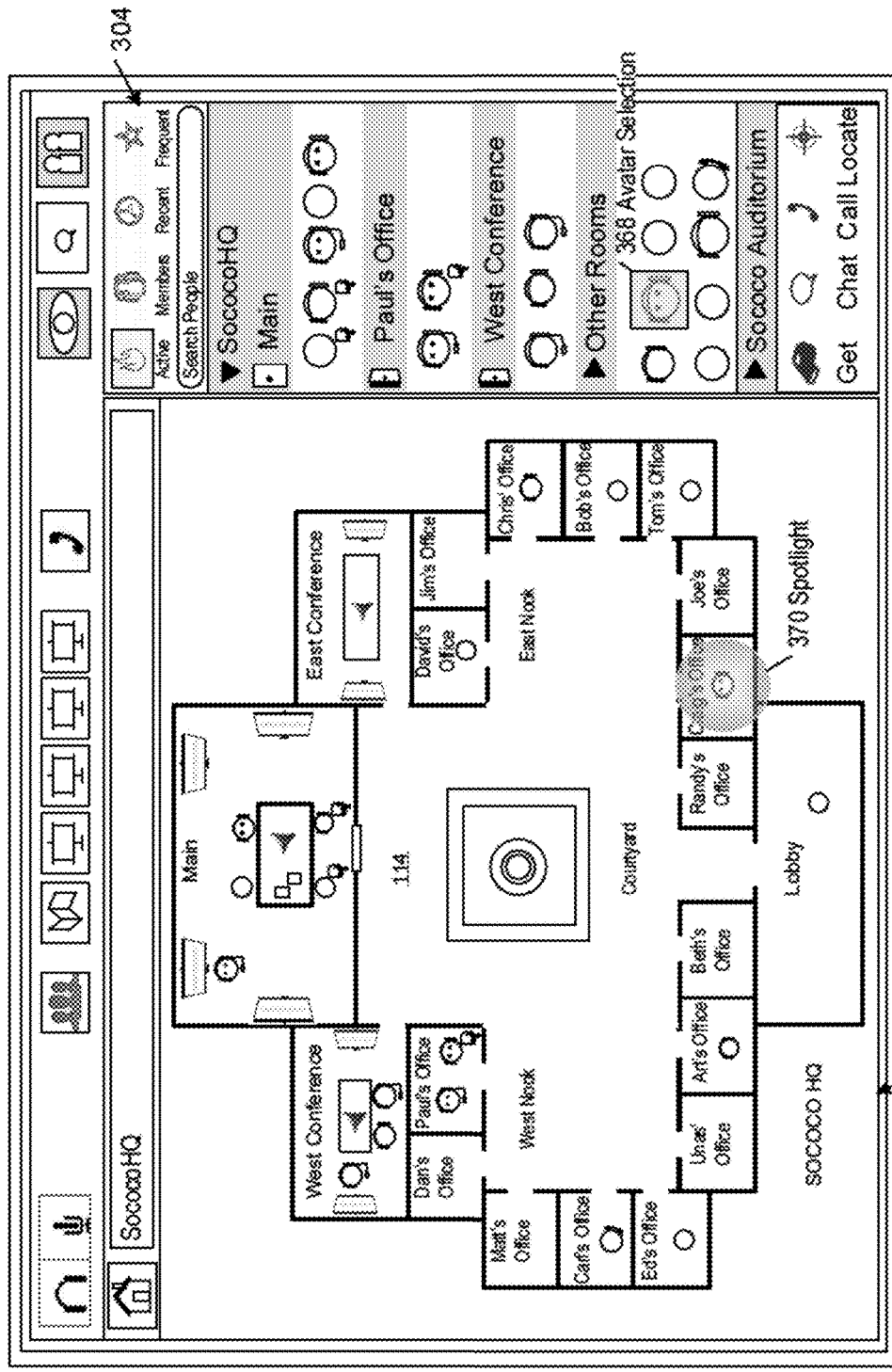
FIG. 5 is a diagrammatic view of an example of a graphical user interface.

Selection of the Locate button 364 in connection with the selection of a communicant's avatar in the people panel 304 causes the platform to highlight that communicant's avatar in the Map view shown in the viewer panel 306. Referring to FIG. 5, for example, in response to selection of a communicant's avatar 368 in the people panel 304, the platform shows in the viewer panel 306 a spatial visualization of the virtual area in which the selected communicant is present (e.g., SOCOCO HQ) with that communicant's sprite highlighted with a spotlight visualization 370 over the sprite in the selected communicant's current zone of presence (i.e., Craig's Office). In the illustrated example, the spotlight visualization 370 includes a circular region that is brighter than the other regions of the virtual area. In other examples, different ways of highlighting the location of the selected communicant's presence may be used.

The people panel 304 also includes a tab bar 400 that includes a set of tabs that are associated with different filtering criteria for presenting different views on the realtime states of Art's contacts and other communicants across Art's virtual areas of membership (i.e., the SOCOCO HQ virtual area 100 and the SOCOCO Auditorium virtual area 200 in the illustrated example). The tab bar 400 includes an Active tab 402, a Members tab 404, a Recent tab 406, and a Frequent tab 408.

The Active tab 402 is associated with filtering criteria that highlight interaction activities grouped by virtual area and by zone within each virtual area, allowing the user to readily determine where the potentially interesting interactions are occurring across the user's areas of membership. With the Active tab 402 selected, the people panel 304 includes a first section 410 that shows the realtime availabilities and activities of the communicants who are present in the SOCOCO HQ virtual area 100 and a second section 412 that shows the realtime availabilities and activities of the communicants who are present in the SOCOCO Auditorium virtual area 200. Each of the virtual area sections 410, 412 includes a respective header bar 414, 416 that includes a descriptive label associated with the virtual area (e.g., the name of the virtual area and other information, such as an announcement, relating to the virtual area) and a respective toggle control that can be toggled to selectively collapse and expand the associated section 410, 412. In the illustrated example, the SOCOCO HQ section 410 is expanded and the SOCOCO Auditorium is collapsed.

Within each virtual area section 410, 412, the communicants who are present in the virtual area are grouped as follows: the communicants in the user's current zone of presence (i.e., Main in this example) are displayed in a capsule 418 at the top of the section; next communicants who are co-presence with other communicants in respective zones of the virtual area are displayed in respective zones of co-presence capsules 420, 422; and the communicants who are alone in respective zones of the virtual area are displayed in a respective "Other Rooms" capsule 424. The zones of co-Presence filtering criteria identify those communicants who are co-present in respective zones of a virtual area. Thus, for each virtual area, the communicants in each group of two or more co-present communicants in the same zone of the virtual area are listed in a separate, selectively expandable and collapsible zone of co-presence capsule in a respective section of the people panel 304. The depiction of the zones of co-presence enables Art to readily visualize all of the conversations that are occurring across all of the communication contexts that are defined by the virtual areas of which Art is a member. In this way, Art can determine whether or not there are any ongoing conversations that he would like to join.

Each of the capsules 418-422 for the current zone of presence and the zones of the co-presences is associated with a respective descriptive user navigable link (e.g., a URI link that includes the name of the zone and other information, such as a label that describes the topic of a meeting currently taking place in the zone—e.g., "Daily Standup" or "Sales Management Meeting"). Each of these capsules 418-422 also is associated with a respective door icon 426, 428, 430 that reflects the current state of the associated door (e.g., open or closed). In the illustrated example, the door icon 426 of the Main zone depicts a door in a closed state to reflect the currently closed state of the Main zone door 144, and each of the door icons 428, 430 depicts a door in an open state to reflect the currently open state of the doors of Paul's Office and the West Conference zones. In this way, the user can obtain a quick sense of the type of meeting that is occurring in the respective zones (e.g., an open or casual meeting, or a closed or private meeting).

Figure 6:
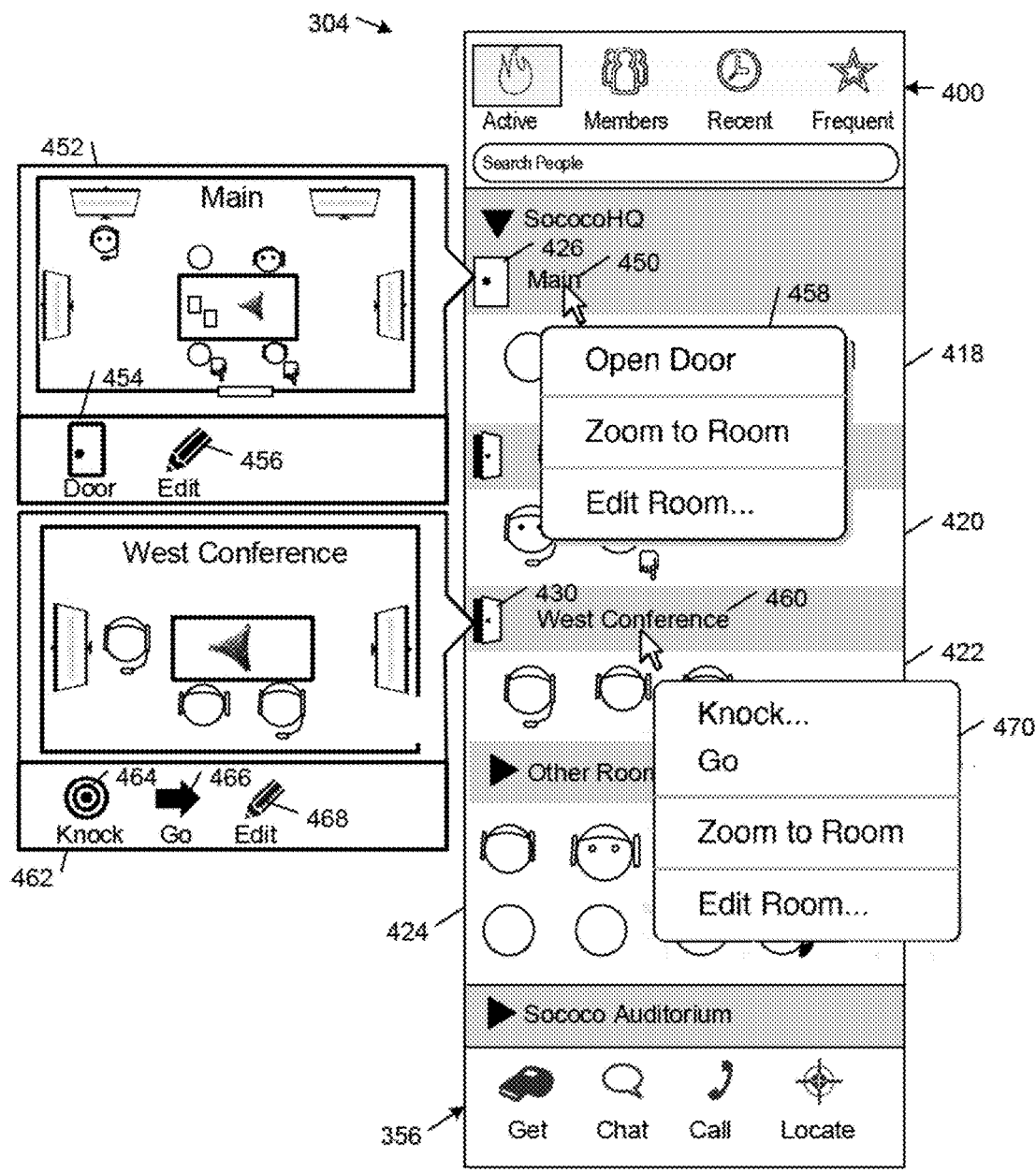
FIG. 6 is a diagrammatic view of an example of a graphical user interface.

Referring to FIG. 6, the people panel 304 provides different options for navigating and interacting the virtual area based on the user's current zone of presence.

For example, in response to the user's left-click selection of the door object 428 for the user's current zone of presence (i.e., Main), the graphical user interface 300 generates a room card 452 that presents a reduced-size spatial visualization of the zone that shows avatars of the communicants who are present in the zone and visual cues indicating their current respective states and realtime activities in the zone. The room card 452 also includes a door button 454 that enables the user to change the state of the door of the zone (e.g., from closed to open), and an edit button 456 that allows the user to edit one or more properties of the zone subject to the user's capabilities (e.g., change the zone label).

In response to the user's right-click selection of the link 450 for the user's current zone of presence (i.e., Main), the graphical user interface generates a menu 458 of options for interacting with the zone. In the illustrated example, the menu 458 includes an open door command that allows the user to change the state of the door of the zone (e.g., from closed to open), a zoom to room command that causes the viewer panel 306 to display a zoomed-in view of the zone, and an edit room command that allows the user to edit one or more properties of the zone subject to the user's capabilities (e.g., change the zone label).

In response to the user's left-click selection of the door object 430 for a zone in which the user is not present (e.g., West Conference), the graphical user interface 300 generates a room card 462 that presents a reduced-size spatial visualization of the zone that shows avatars of the communicants who are present in the zone and visual cues indicating their current respective states and realtime activities in the zone. The room card 462 also includes a knock button 464 that enables the user to send a knock request to one or more occupants of the zone, a go button 466 that enables the user to either (i) enter the zone if the door is open or the user owns the zone or (ii) send a knock request to one or more occupants of the zone if the door is closed and the user is not the owner, and an edit button 468 that allows the user to edit one or more properties of the zone subject to the user's capabilities (e.g., change the zone label).

In response to the user's right-click selection of the link 460 for a zone in which the user is not present (e.g., West Conference), the graphical user interface 300 generates a menu 470 of options for interacting with the zone. In the illustrated example, the menu 470 includes a knock command that enables the user to send a knock request to one or more occupants of the zone, a go command that enables the user to either (i) enter the zone if the door is open or the user owns the zone or (ii) send a knock request to one or more occupants of the zone if the door is closed and the user does not own the zone, a zoom to room command that causes the viewer panel 306 to display a zoomed-in view of the zone, and an edit room command that allows the user to edit one or more properties of the zone subject to the user's capabilities (e.g., change the zone label).

In some examples, the graphical user interface 300 generates person cards in response to user selection of a communicant's avatar in the people panel 304. A person card provides information about particular communicant (e.g., attributes, activity information, and state information) and a set of commands for interacting with the communicant. The information and commands that are included in the person card for a particular communicant typically depend on the user's state in relation to the state of the particular communicant. For example, in some examples, communicants are able to broadcast video streams (e.g., video chat streams) into the zones in which they are present, but only communicants in the same zone can subscribe to those video streams. In these examples, the user is not presented with an option to subscribe to the video stream that is broadcasted into a particular zone unless the user is in the same zone as the communicant who is broadcasting the video feed. In some examples, the platform provides a doorbell function that causes a communicant's network node to generate an audible sound (e.g., a doorbell sound) that prompts the communicant to turn on his or her headset. In these examples, the user is not presented with an option to ring the doorbell of a particular communicant unless the user is in the same zone as that communicant.

Figure 7:
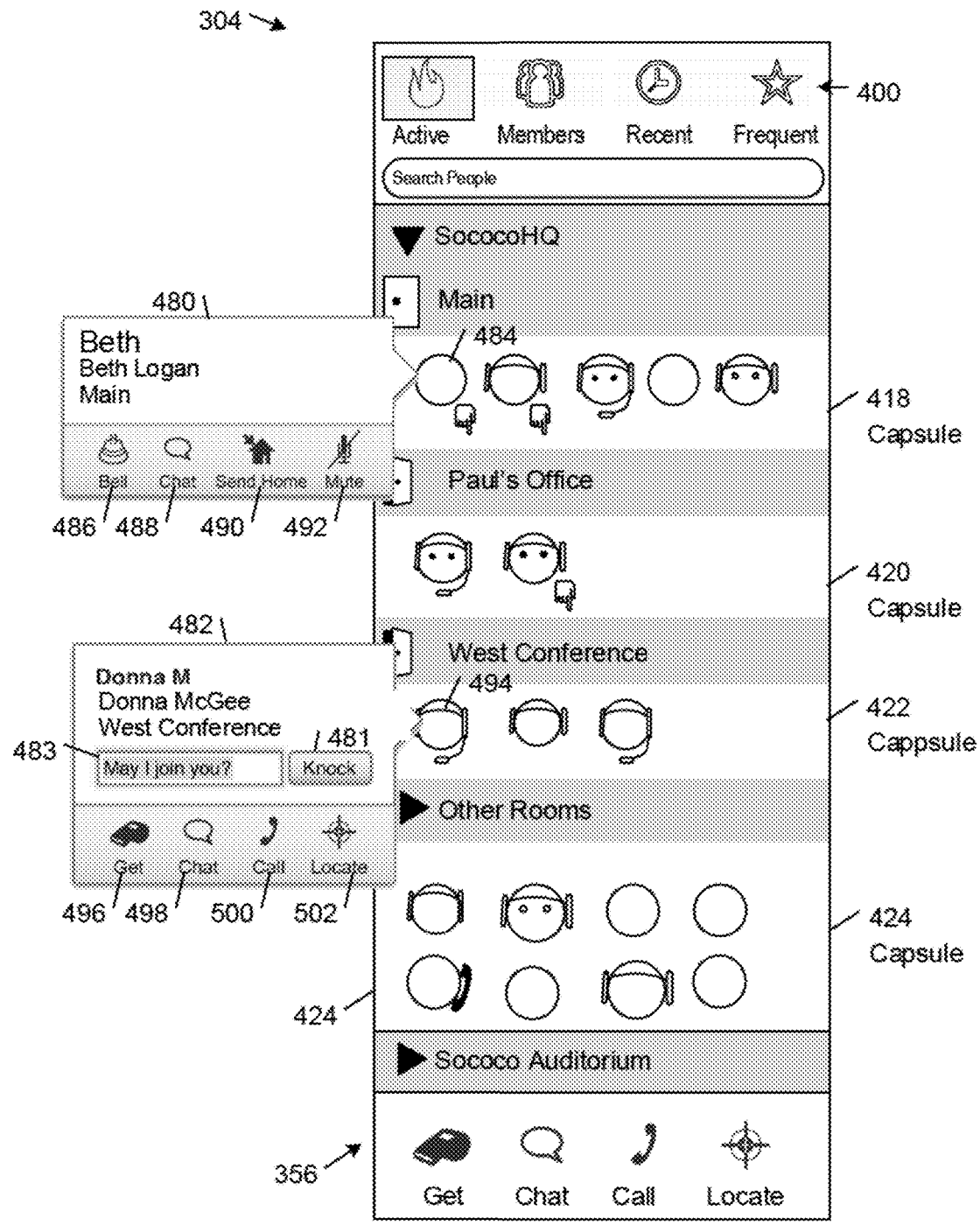
FIG. 7 is a diagrammatic view of an example of a graphical user interface.

FIG. 7 shows examples of person cards 480, 482 that are displayed in the graphical user interface in response to user selection of communicant avatars in the people panel 265.

The graphical user interface generates the person card 480 in response to user selection of the avatar 484 in the Main zone, where the user currently is present. The person card 480 lists the associated communicant's name (e.g., the communicant's real full or partial name, nickname, pseudonym, or other designation), the communicant's full name (i.e., "Beth Logan"), and the communicant's current zone of presence in the virtual area (i.e., the Main zone in the SOCOCO HQ virtual area). The person card 480 also includes a bell button 486, a chat button 488, a send home button 490, and a mute button 492. The bell button 486 allows the user to cause Beth's network node to generate a sound ("ring the doorbell") that prompts Beth to turn on her headset. The chat button 488 allows the user to communicate with Beth in a persistent private peer-to-peer chat room that is owned jointly by the user and Beth. Subject to the user's capabilities (e.g., the user has a moderator role or is present in the same zone as Beth), the send home button 490 allows the user to move Beth's presence from the current zone to Beth's designated zone (e.g., Beth's home zone or a default zone of the virtual area, such as the Lobby). Subject to the user's capabilities (e.g., the user has a moderator role or is present in the same zone as Beth), the mute button 492 allows the user to mute Beth's microphone such that she cannot broadcast audio into the zone.

The graphical user interface generates the person card 482 in response to user selection of the avatar 494 in the West Conference zone, where the user currently is not present.

The person card 482 lists the associated communicant's name (i.e., "Donna M"), the communicant's full name (i.e., "Donna McGee"), and the communicant's current zone of presence in the virtual area (i.e., the West Conference zone in the SOCOCO HQ virtual area). The person card 482 presents a knock button 481 and an associated knock message box 483 that allows the user to send a directed knock message (e.g., "May I join you?") to the target communicant (i.e., Donna M) corresponding to the selected avatar 494. In response to user selection of the knock button 481, the platform sends a knock notification that includes the knock message only to the target communicant and not to any other communicants in the zone. The person card 482 also includes a get button 496, a chat button 498, a call button 500, and a locate button 502, which operate with respect to the communicant represented by the selected avatar 494 with the same functionalities as the buttons 440-446 described above in connection with the people interaction toolbar 304.

Figure 8:
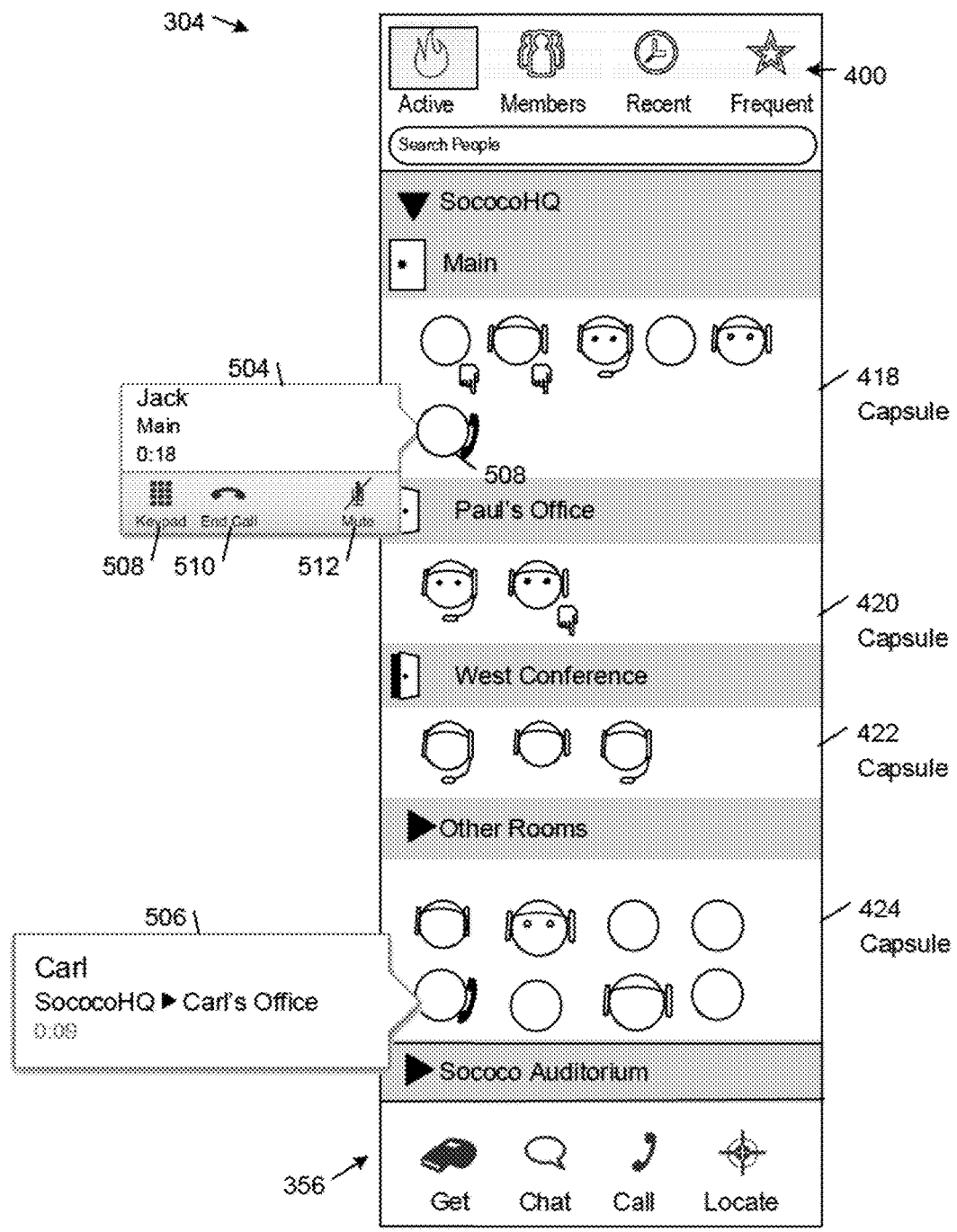
FIG. 8 is a diagrammatic view of an example of a graphical user interface.

FIG. 8 shows examples of person cards 504, 506 that are displayed in the graphical user interface 300 in response to user selection of avatars representing telephony device users (e.g., communicants who call into a virtual area zone or communicants who are called by a communicant from a zone of a virtual area) in the people panel 304.

The graphical user interface 300 generates the person card 504 in response to user selection of an avatar 508 in the Main zone, where the user currently is present. The person card 504 lists the associated telephony device user's name (i.e., "Jack"), the telephony device user's current zone of presence in the virtual area (i.e., the Main zone in the SOCOCO HQ virtual area), and the current duration of the telephony device user's session in the zone. The person card 480 also includes a keypad button 508 that brings up a telephony interface for interacting with the current telephony device user (i.e., Jack) or dialing another telephone number, an end call button 510 for terminating the telephone call with Jack, and a mute button 512 that allows the user to mute Jack's microphone such that he cannot broadcast audio into the zone subject to the capabilities of the user (e.g., the user has a moderator role or is present in the same zone as Jack).

The graphical user interface 300 generates the person card 506 in response to user selection of the avatar 494 in the West Conference zone, where the user currently is not present. The person card 506 lists the associated telephony device user's name (i.e., "Carl"), the telephony device user's current zone of presence in the virtual area (i.e., the Carl's Office zone in the SOCOCO HQ virtual area), and current duration of the telephony device user's session in the zone.

Figure 9:
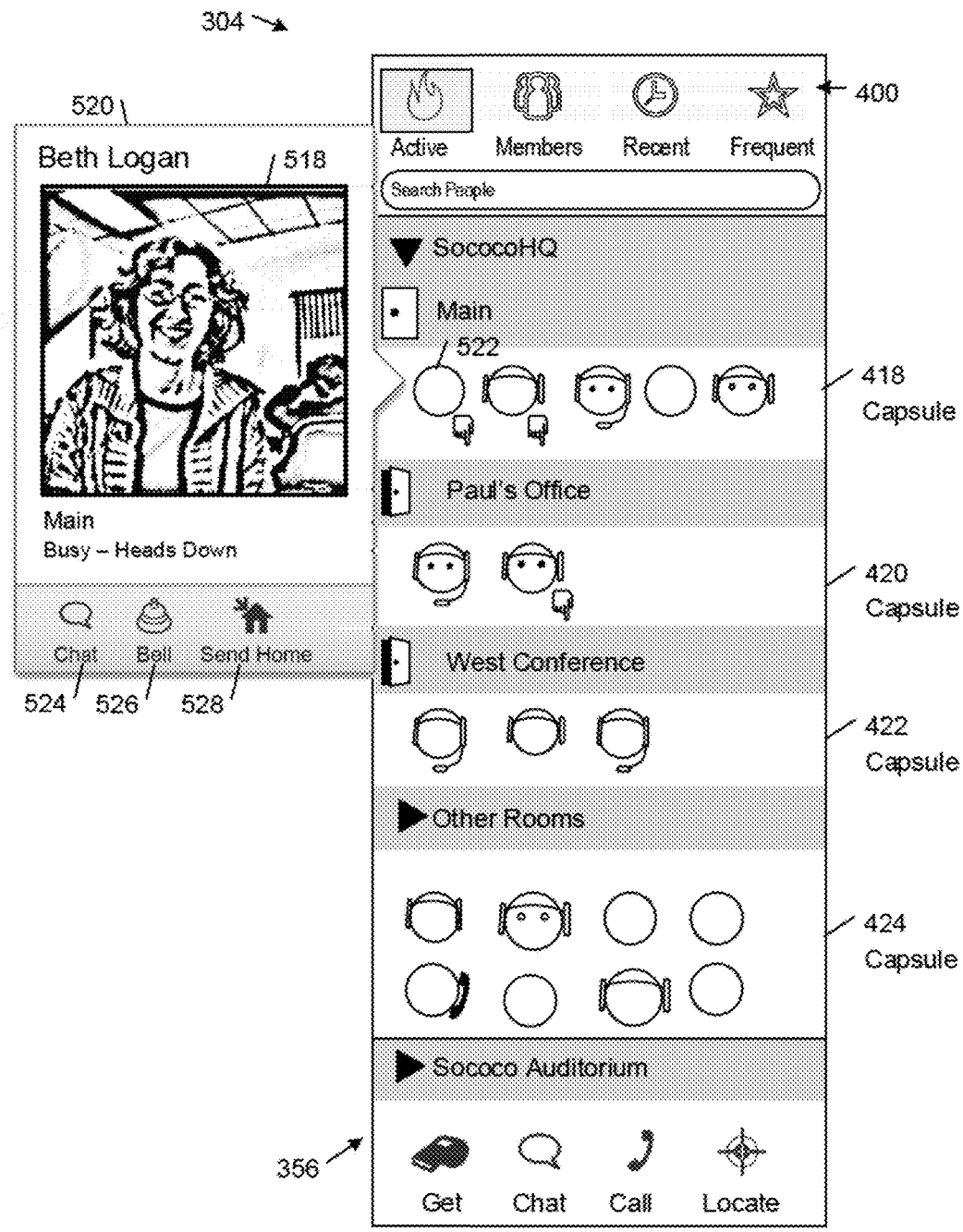
FIG. 9 is a diagrammatic view of an example of a graphical user interface.

FIG. 9 shows an example of a person card 520 that is displayed in the graphical user interface 300 in response to user selection of an avatar 522 of a selected communicant who is broadcasting a video feed (e.g., a video chat feed) into the user's current zone of presence. The person card 520 lists the selected communicant's name (i.e., "Beth Logan"), the select communicant's current zone of presence in the virtual area (i.e., the Main zone in the SOCOCO HQ virtual area), and the selected communicant's status attribute (i.e., "Busy-Heads Down"). The person card 520 includes a video display window 518 in which the video feed broadcasted by the selected communicant is rendered. The person card 520 also includes a chat button 524, a bell button 526, and a send home button 528, which operate with respect to the selected communicant with the same functionalities as the buttons 488, 486, and 490 described above in connection with the person card 480 shown in FIG. 7.

Figure 10:
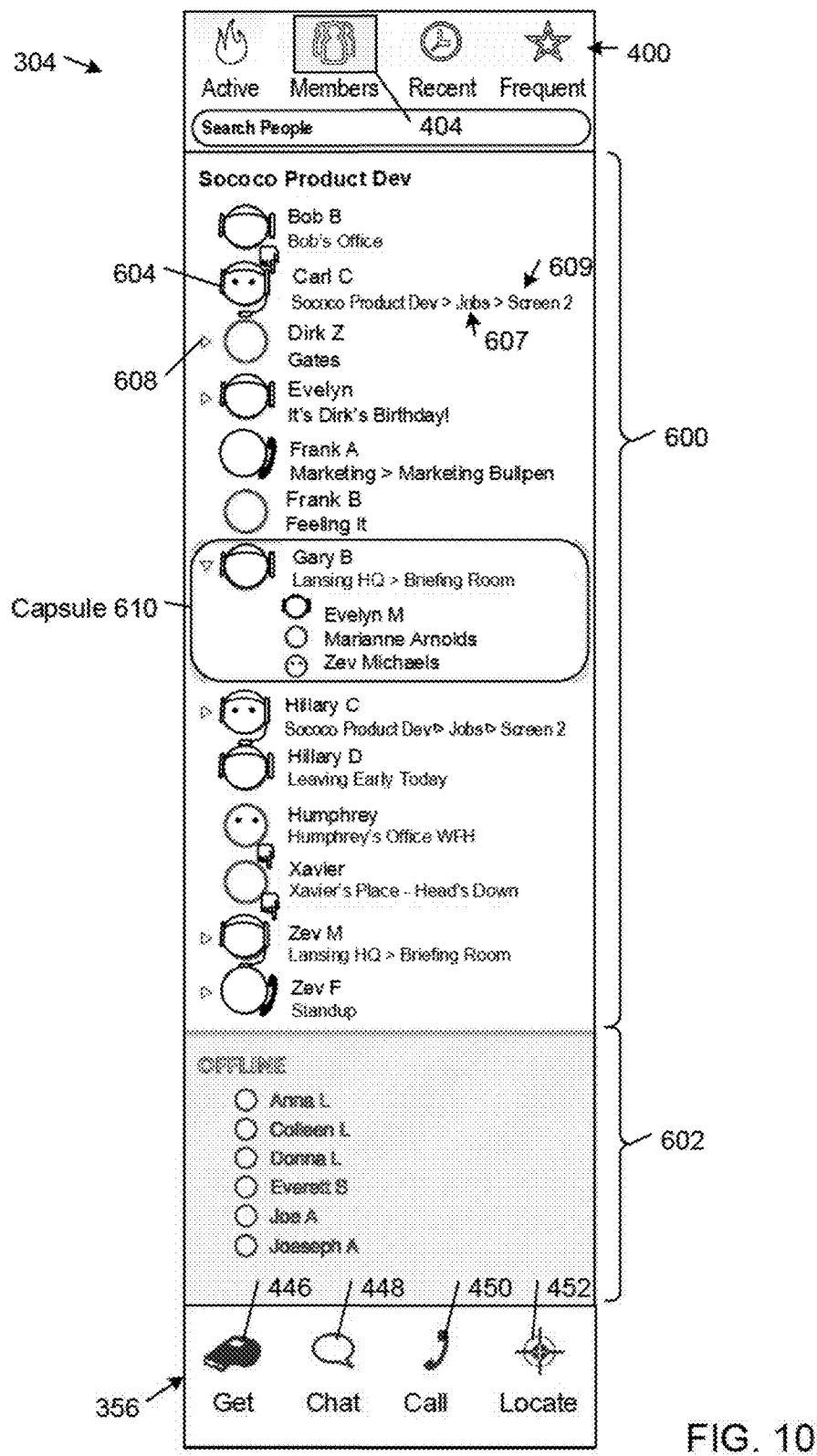
FIG. 10 is a diagrammatic view of an example of a graphical user interface.

Referring to FIG. 10, the Members tab 404 of the people panel 304 is associated with filtering criteria that enable identity-based searching of communicants grouped by membership. The Members tab 404 highlights the current locations and activities of the members of a particular virtual area, allowing the user to readily find particular communicants based on their respective memberships regardless of their current location or state in the virtual communications environment. In the illustrated example, Art is a member of the SOCOCO Product Development virtual area ("SOCOCO Product Dev").

With the Members tab 404 selected, the people panel 304 includes an online members section 600 and an offline members section 602. The online member section 600 lists all of the members of the SOCOCO Product Development virtual area who currently are logged into the virtual communications environment alphabetically by display name, whereas the offline members section 602 lists all of the remaining members of the communications environment who currently are logged out of the communications environment alphabetically by display name. For each communicant listed in the online members section 600 and the offline members section 602, the people panel 304 displays the communicant's avatar 604 (along with visual cues revealing the communicant's current state and activity) and the communicant's name 605 (e.g., "Dirk Z"). For each communicant listed in the online members section 600, the people panel 265 also includes a descriptive, user-navigable link 606 (e.g., a URI) to the communicant's current location of presence in the communications environment (e.g., the Gates zone of the virtual area in which the user currently is present). In addition to naming the communicant's zone of presence, the link 606 also includes the name of any prop with which the communicant currently is interacting. For example, if a communicant currently is sharing or viewing an application in connection with a viewscreen object in a particular zone or sharing a file in connection with a table object in a particular zone, the people panel 304 will include in the location link 606 the name of the viewscreen object along with the name of the particular zone (see, e.g., the listing for Carl C, which shows that the communicant currently is associated with Screen 2 in the Jobs zone of the user's current virtual area of presence). In response to the user's selection of the link associated with a particular communicant in the online members section 600, the platform automatically navigates the user to the zone or prop identified by the link. For example, in response to user selection of the link 607 associated with Carl C, the platform automatically navigates the user to the Gates zone of the user's current area of presence and in response to user selection of the link 609 associated with Carl C, the platform automatically navigates the user to the Jobs zone of the user's current area of presence and configures that user's communications application 26 to view screen share video feeds of an application (e.g., a document processing application, such as a Microsoft Office® application) being shared in connection with the Screen 2 viewscreen object.

The Members tab 404 also displays a toggle control 608 beside the selection control 604 of each of the communicants who currently is co-located with one or more other communicants in a particular zone of a virtual area in the communications environment. Each toggle control 608 can be toggled to selectively open and close a zone of co-presence capsule that lists the associated communicant and the other communicants who are co-present in the same zone. For example, the toggle control associated with the communicant Gary B has been set to display a zone of co-presence capsule 610 that shows the communicant's name ("Gary B"), a link to the zone of co-presence (i.e., the Briefing Room zone of the Lansing HQ virtual area) in which the communicant is present, and a list of all the other communicants who also are present in the zone (e.g., Evelyn M, Marianne Arnolds, and Zev Michaels), where each of the communicant names in the list is shown adjacent the communicant's avatar (along with visual cues revealing the communicant's current state and activity).

Figures 11, 12A:
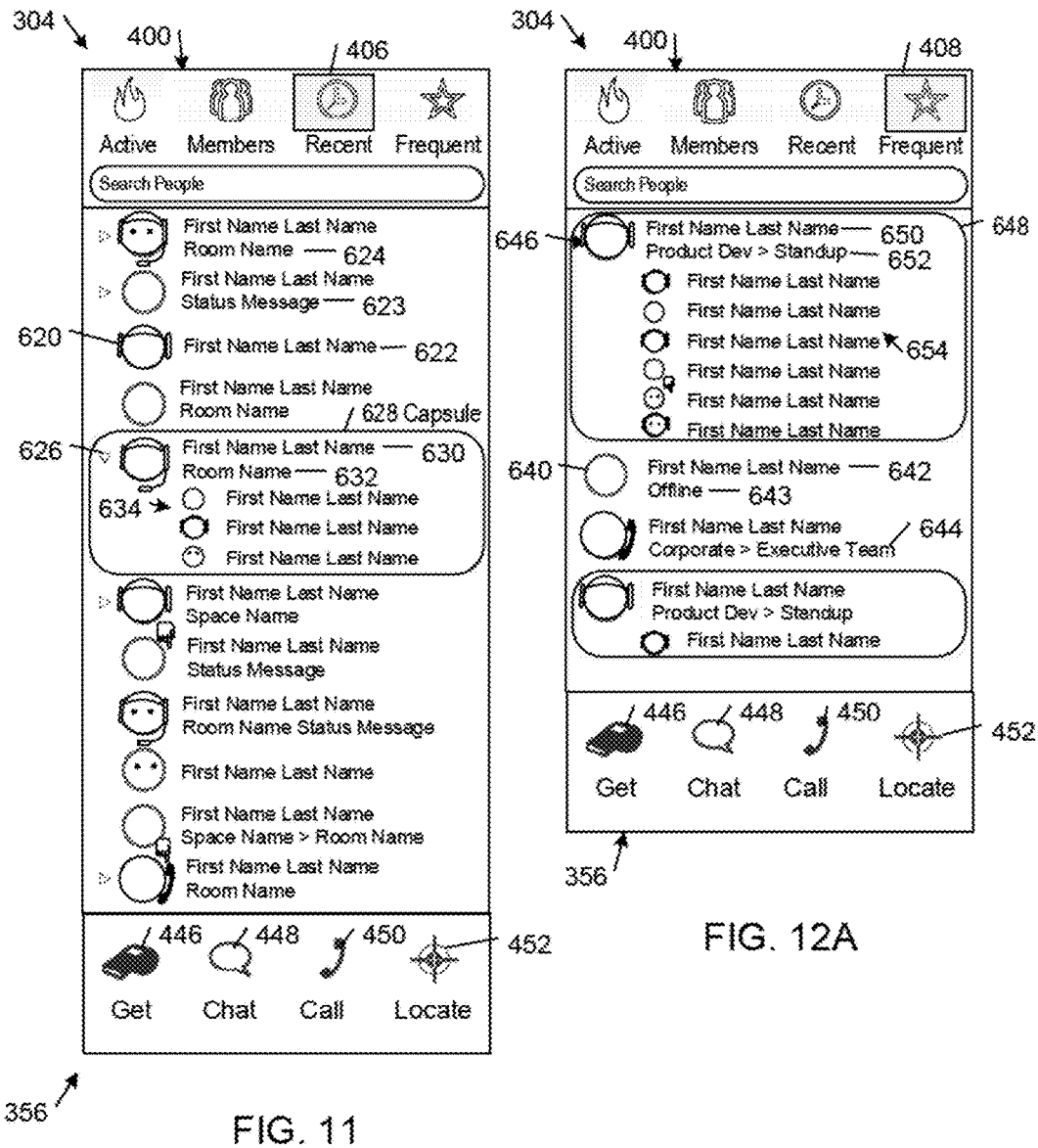
FIG. 11 is a diagrammatic view of an example of a graphical user interface.
FIG. 12A is a diagrammatic view of an example of a graphical user interface.

Referring to FIG. 11, the Recent tab 406 of the people panel 304 is associated with filtering criteria that highlight communicants with whom the user has most recently interacted.

The Recent tab 406 shows a list of the communicants with whom the user has interacted via any communication channel (e.g., voice, chat, video, application sharing, or file sharing) in reverse chronological order. For each communicant listed in the Recent tab 406, the people panel 304 displays the communicant's avatar 620 (along with visual cues revealing the communicant's current state and activity) and the communicant's name 622. If a communicant is offline, the people panel 304 includes a status message 623 below the communicant's name. If a communicant is online, the people panel 304 includes below the communicant's name a descriptive, user-navigable link 624 (e.g., a URI) to the communicant's current location of presence in the communications environment and the name of any prop with which the communicant currently is interacting. In response to the user's selection of the link associated with a particular communicant, the platform automatically navigates the user to the zone or prop identified by the link.

The Recent tab 406 also displays a respective toggle control 626 beside the avatar 620 of each of the communicants who currently is co-located with another communicant in a particular zone of a virtual area in the communications environment. Each toggle control 626 can be toggled to selectively open and close a respective zone of co-presence capsule 628 that lists the associated communicant and the other communicants who are co-present in the same zone. Each zone of co-presence capsule shows the communicant's name 630, a link 632 to the zone of co-presence in which the communicant is present, and a list 634 of all the other communicants who also are present in the zone, where each of the communicant names in the list is associated with a respective selection control.

Referring to FIG. 12A, the Frequent tab 408 of the people panel tab 304 is associated with filtering criteria that highlights communicants with whom the user has most frequently interacted.

The Frequent tab 408 shows a list of the communicants with whom the user has most frequently interacted via any communication channel (e.g., voice, chat, video, application sharing, or file sharing) in order of interaction frequency. For each communicant listed in the Frequent tab 408, the people panel 304 displays the communicant's avatar 640 (along with visual cues revealing the communicant's current state and activity) and the communicant's name 642. If a communicant is offline, the people panel 304 includes a status message 643 below the communicant's name (e.g., "Offline"). If a communicant is online, the people panel 304 includes below the communicant's name a descriptive, user-navigable link 644 (e.g., a URI) to the communicant's current location of presence in the communications environment and the name of any prop with which the communicant currently is interacting. In response to the user's selection of the link associated with a particular communicant, the platform automatically navigates the user to the zone or prop identified by the link.

The Frequent tab 408 also displays a respective toggle control 646 beside the avatar 640 of each of the communicants who currently is co-located with one or more other communicants in a particular zone of a virtual area in the communications environment. Each toggle control 646 can be toggled to selectively open and close a respective zone of co-presence capsule 648 that lists the associated communicant and the other communicants who are co-present in the same zone. Each zone of co-presence capsule shows the communicant's name 650, a link 652 to the zone of co-presence in which the communicant is present, and a list 654 of all the other communicants who also are present in the zone, where each of the communicant names in the list is shown adjacent the communicant's avatar 640 (along with visual cues revealing the communicant's current state and activity).

Figure 12B:
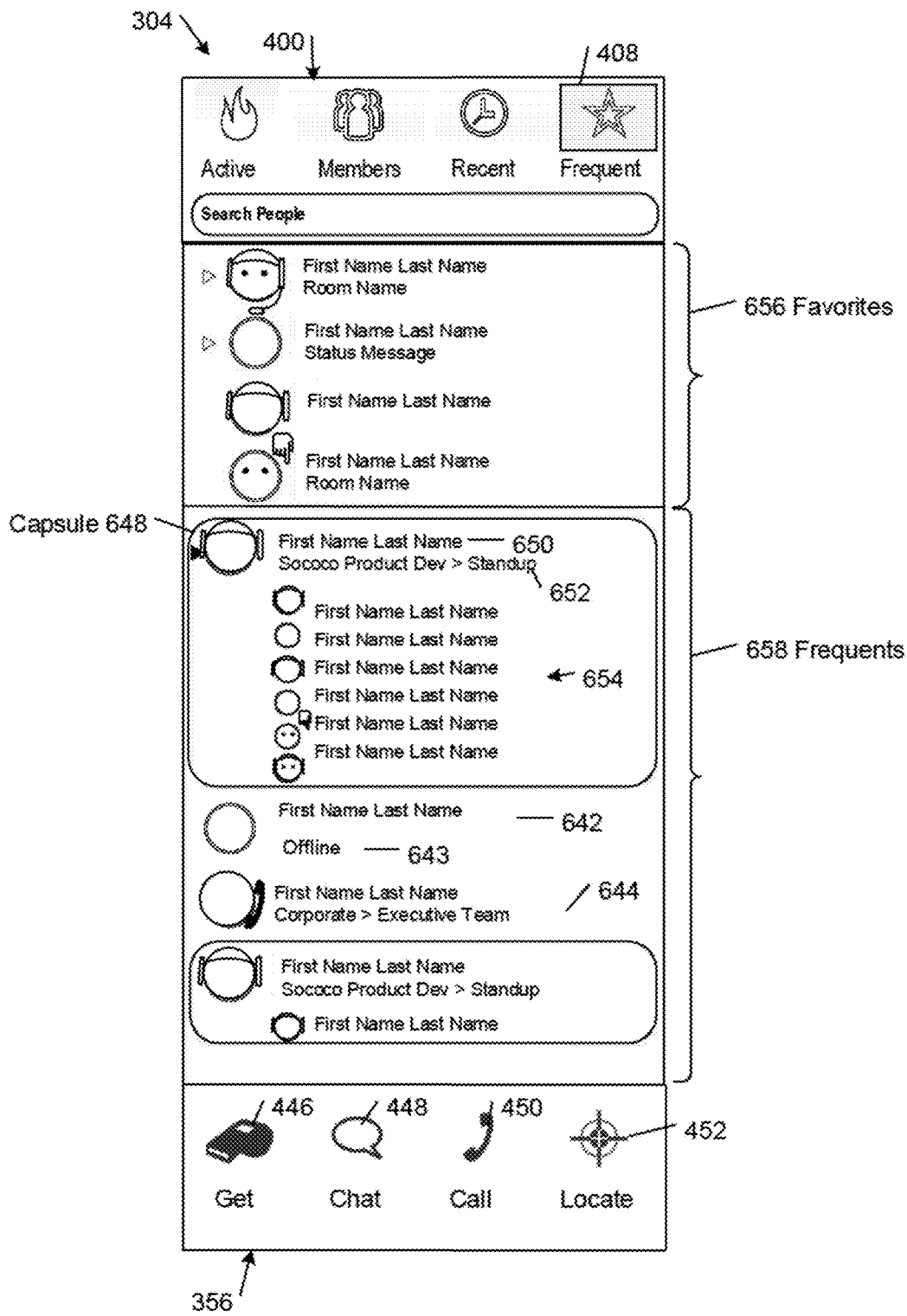
FIG. 12B is a diagrammatic view of an example of a graphical user interface.

Some examples of the graphical user interface 304 include a control that allows the user to add contacts to a Favorites list. In response to user selection of a respective one of the avatars, the graphical user interface 304 presents to the user a people menu that includes an option to add the contact represented by the selected avatar to the Favorites list. In some examples, the Favorites list is incorporated into the view shown in FIG. 12A in connection with the Frequent tab 408. In the example shown in FIG. 12B, the avatars of the user's contact in the Favorites list are displayed in a Favorites section 656 and the list of the communicants with whom the user has most frequently interacted via any communication channel (e.g., voice, chat, video, application sharing, or file sharing) are shown in a Frequents section 658 in order of interaction frequency. For each communicant listed in the Favorites section 656, the people panel 304 displays the communicant's avatar (along with visual cues revealing the communicant's current state and activity) and the communicant's name. If a communicant is offline, the Favorites section 656 includes a status message 643 below the communicant's name (e.g., "Offline"). If a communicant is online, the Favorites section 656 includes below the communicant's name a descriptive, user-navigable link (e.g., a URI) to the communicant's current location of presence in the communications environment and the name of any prop with which the communicant currently is interacting. In response to the user's selection of the link associated with a particular communicant, the platform automatically navigates the user to the zone or prop identified by the link. The Favorites section 656 also displays a respective toggle control beside the avatar of each of the communicants who currently is co-located with one or more other communicants in a particular zone of a virtual area in the communications environment. Each toggle control can be toggled to selectively open and close a respective zone of co-presence capsule that lists the associated communicant and the other communicants who are co-present in the same zone. Each zone of co-presence capsule shows the communicant's name, a link to the zone of co-presence in which the communicant is present, and a list of all the other communicants who also are present in the zone, where each of the communicant names in the list is shown adjacent the communicant's avatar (along with visual cues revealing the communicant's current state and activity).

Figure 13A:
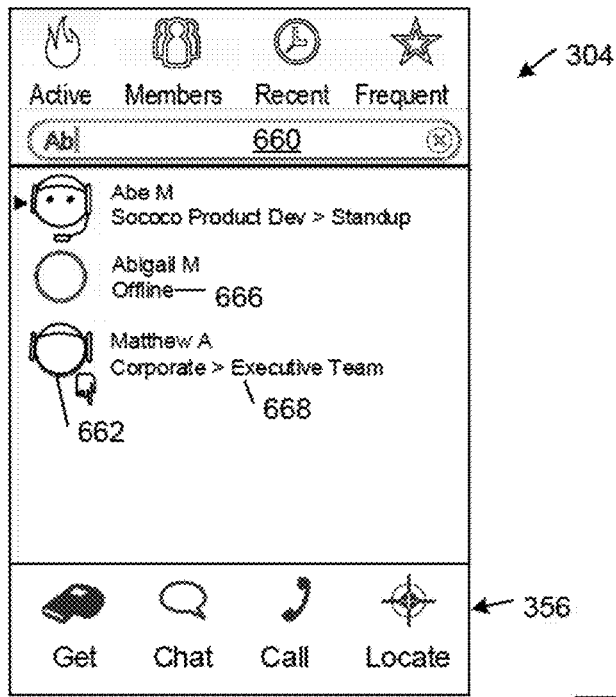
FIGS. 13A and 13B are respective diagrammatic views of an example of a graphical user interface.
Figure 13B:
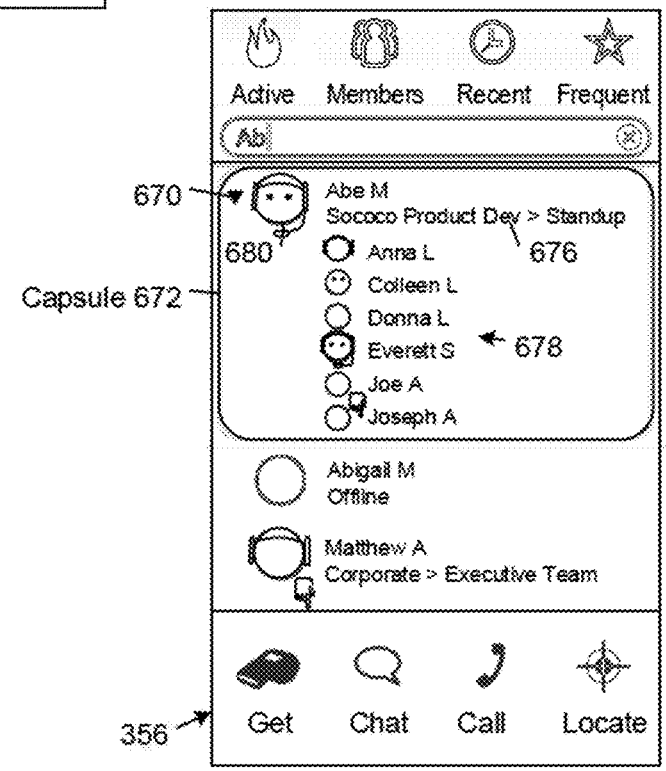

Referring to FIGS. 13A and 13B, the people panel 304 additionally includes a search box 660 that allows the user to search for a specific communicant by name.

In response to text entered into the search box 660, the platform searches for matching character strings in one or more databases containing lists of the user's contacts, communicants who are co-members of the same virtual areas with the user, co-members of the same organization, and potentially other people who are associated with the user. In some examples, the platform identifies matches between the search text and the first name, last name, nicknames, pseudonyms, or other designations of the communicants who are associated with the user. The matching results are revealed as the text is entered into the search box 660. For each match, the people panel 304 displays the communicant's avatar 662 (along with visual cues revealing the communicant's current state and activity), and the communicant's name 664. If a communicant is offline, the people panel 304 includes a status message 666 below the communicant's name (e.g., "Offline"). If a communicant is online, the people panel 304 includes below the communicant's name a descriptive, user-navigable link 668 (e.g., a URI) to the communicant's current location of presence in the communications environment and the name of any prop with which the communicant currently is interacting. In response to the user's selection of the link associated with a particular communicant, the platform automatically navigates the user to the zone or prop identified by the link.

The people panel 304 also displays a respective toggle control 670 beside the avatar of each of the communicants who currently is co-located with one or more other communicants in a particular zone of a virtual area in the communications environment. Each toggle control 670 can be toggled to selectively open and close a respective zone of co-presence capsule 672 that lists the associated communicant and the other communicants who are co-present in the same zone. Each zone of co-presence capsule shows the communicant's name 674, a link 676 to the zone of co-presence in which the communicant is present, and a list 678 of all the other communicants who also are present in the zone, where each of the communicant names in the list is shown adjacent the communicant's avatar 680 (along with visual cues revealing the communicant's current state and activity).

Figure 14:
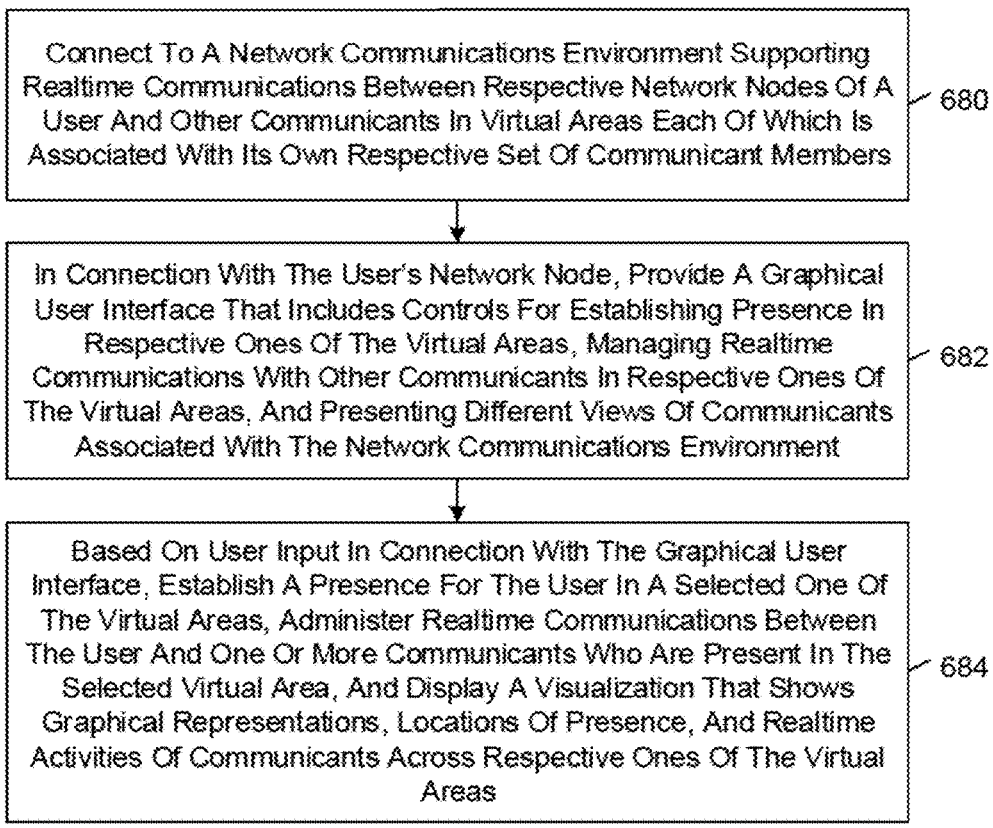
FIG. 14 is a flow diagram of an example of a method.

FIG. 14 shows an example of a method by which the client communications application generates different views on the realtime states of a user contacts and other communicants across the user's virtual areas of membership. In accordance with this method, the client communications application connects to a network communications environment supporting realtime communications between respective network nodes of a user and other communicants in virtual areas each of which is associated with its own respective set of communicant members (FIG. 14, block 680). In connection with the user's network node, client communications application provides a graphical user interface that includes controls for establishing presence in respective ones of the virtual areas, managing realtime communications with other communicants in respective ones of the virtual areas, and presenting different views of communicants associated with the network communications environment (FIG. 14, block 682). Based on user input in connection with the graphical user interface, client communications application establishes a presence for the user in a selected one of the virtual areas, administers realtime communications between the user and one or more communicants who are present in the selected virtual area, and displays a visualization that shows graphical representations, locations of presence, and realtime activities of communicants across respective ones of the virtual areas (FIG. 14, block 684).

In some examples, graphical representations of respective ones of the communicants include respective avatars and associated names.

In some examples, based on information received from the virtual area platform, the client communications application assigns respective ones of the communicants into respective groups according to their respective locations of presence in the virtual areas, and shows the graphical representations and realtime activities of the communicants in different sections of the visualization according to the respective groups into which the communicants are assigned, where each section corresponds to a respective location of presence (e.g., a virtual area or a zone of a virtual area). In some of these examples, the graphical representations and realtime activities of co-located communicants are grouped together in respective sections of the visualization.

In some examples, each of respective ones of the virtual areas includes multiple respective zones, where each zone supports establishment of communicant presence and realtime communications between network nodes associated with the zone. In these examples, the client communications application typically shows in the visualization visual indications of the zones in which respective ones of the communicants are present. In some cases, a particular one of the sections of the visualization corresponds to a particular one of the virtual areas that includes multiple zones, and in different sub-sections of the particular section the client communications application shows the graphical representations and realtime activities of the communicants in the particular virtual area according to communicants' respective zones of presence in the particular virtual area.

In some examples, the client communications application typically shows the graphical representations and realtime activities of the communicants in the zone in which the user is present in at least one of the sub-sections of the particular section of the visualization.

In some examples, for each zone of co-presence in the particular virtual area, the client communications application shows the graphical representations and realtime activities of the communicants in the zone in a respective one of the sub-sections of the particular section of the visualization.

In some examples, the client communications application shows the graphical representations and realtime activities of the communicants who are alone in respective ones of the zones of the particular virtual area grouped together in a respective one of the sub-sections of the particular section of the visualization.

In some examples, each of respective ones of the zones of the particular virtual area is associated with a respective door object having different states that are associated with different respective rules for granting communicant access to the zone, and the displaying includes displaying in respective ones of the sub-sections visual indications of the states of the door objects associated with the respective zones. In response to user input in connection with a selected one of the sub-sections, the client communications application presents a zone interface for interacting with the particular zone corresponding to the selected sub-section. The zone interface typically includes a selection of zone interaction controls that depend on whether or not the user is present in the particular zone. Based on a determination that the user is present in the particular zone, the selection of zone interface controls typically includes a door control that enables the user to change the state of the door object associated with the particular zone. Based on a determination that the user is not present in the particular zone, the selection of zone interface controls typically includes a knock control that enables the user to send a message requesting entry into the particular zone to one or more communicants who are present in the particular zone. In some examples, based on a determination that the user is not present in the particular zone, the selection of zone interface controls includes a navigation control, where if the associated door object is in the open state or the user is an owner of the particular zone the navigation control enables the user to enter the particular zone, otherwise the navigation control enables the user to send a message requesting entry into the particular zone to a communicant who is present in the particular zone.

In some examples, the client communications application shows the graphical representations and realtime activities of the communicants who are members of a particular one of the virtual areas and are present in the network communications environment in a first section of the visualization, and showing graphical representations of the communicants who are members of the particular virtual area and are not present in the network communications environment in a second section of the visualization.

In some examples, the client communications application shows the graphical representations and realtime activities of the communicants who are members of a particular one of the virtual areas and are present in the network communications environment in a sequence ordered by communicant name. In some of these examples, each of respective ones of the virtual areas includes multiple respective zones, where each zone supports establishment of communicant presence and realtime communications between network nodes associated with the zone. In these examples, the client communications application shows visual indications of the zones in which respective ones of the communicants are present.

In some examples, for each of the communicants represented in the visualization and co-present with at least one other communicant in a respective zone of a virtual area, the client communications application shows an associated indication that the communicant is in a zone of co-presence. In connection with a respective one of the indications that a particular one of the communicants is in a zone of co-presence, the client communications application typically shows visual indications of other ones of the communicants who are co-present in the zone of co-presence. The visual indications of the other co-present communicants typically include visual indications of the graphical representations and realtime activities of the other co-present communicants.

In some examples, based on information received from the virtual area platform, the client communications application determines a group of the communicants based on recentness of interaction with the user. In some of these examples, the client communications application shows the graphical representations and realtime activities of the communicants in the determined group in a sequence ordered by recentness of interaction with the user. In some of these examples, each of respective ones of the virtual areas includes multiple respective zones, where each zone supports establishment of communicant presence and realtime communications between network nodes associated with the zone. The client communications application typically shows visual indications of the zones in which respective ones of the communicants are present. In some examples, for each of the communicants in the determined group and co-present with at least one other communicant in a respective zone of a virtual area, the client communications application shows an associated indication that the communicant is in a zone of co-presence. In connection with a respective one of the indications that a particular one of the communicants is in a zone of co-presence, the client communications application typically shows visual indications of other ones of the communicants who are co-present in the zone of co-presence.

In some examples, based on information received from the virtual area platform, the client communications application determines a group of the communicants based on frequency of interaction with the user, and the client communications application shows the graphical representations and realtime activities of the communicants in the determined group in a sequence ordered by frequency of interaction with the user. In some of these examples, each of respective ones of the virtual areas includes multiple respective zones, where each zone supports establishment of communicant presence and realtime communications between network nodes associated with the zone. In these examples, the client communications application typically shows visual indications of the zones in which respective ones of the communicants are present. In some examples, for each of the communicants in the determined group and co-present with at least one other communicant in a respective zone of a virtual area, the client communications application shows an associated indication that the communicant is in a zone of co-presence. In connection with a respective one of the indications that a particular one of the communicants is in a zone of co-presence, the client communications application typically shows visual indications of other ones of the communicants who are co-present in the zone of co-presence.

In some examples, based on user selection of a respective one of the graphical representations of a particular one of the communicants, the client communications application presents an interface element showing a set of one or more controls for interacting with the particular communicant. In some of these examples, the location of presence of the particular communicant is associated with a respective door object having different states that are associated with different respective rules for granting communicant access to the zone, and the interface element shows a control associated with functionality for sending a message requesting entry into the location of presence of the particular communicant directed only to the particular communicant. In some examples, the interface element shows a control associated with functionality for triggering the network node of the particular communicant to generate a sound that prompts the particular communicant to enable an audio channel for communicating with the user in the location of presence of the particular communicant. In some examples, the interface element shows a control associated with functionality for automatically removing the particular communicant from the particular communicant's current location of presence to a pre-designated location in a respective one of the virtual areas independently of any input from the particular communicant. In some examples, the interface element shows a control associated with functionality for highlighting the location of presence of the particular communicant in a spatial visualization of the respective virtual area in which the particular communicant is present.

Figure 15:
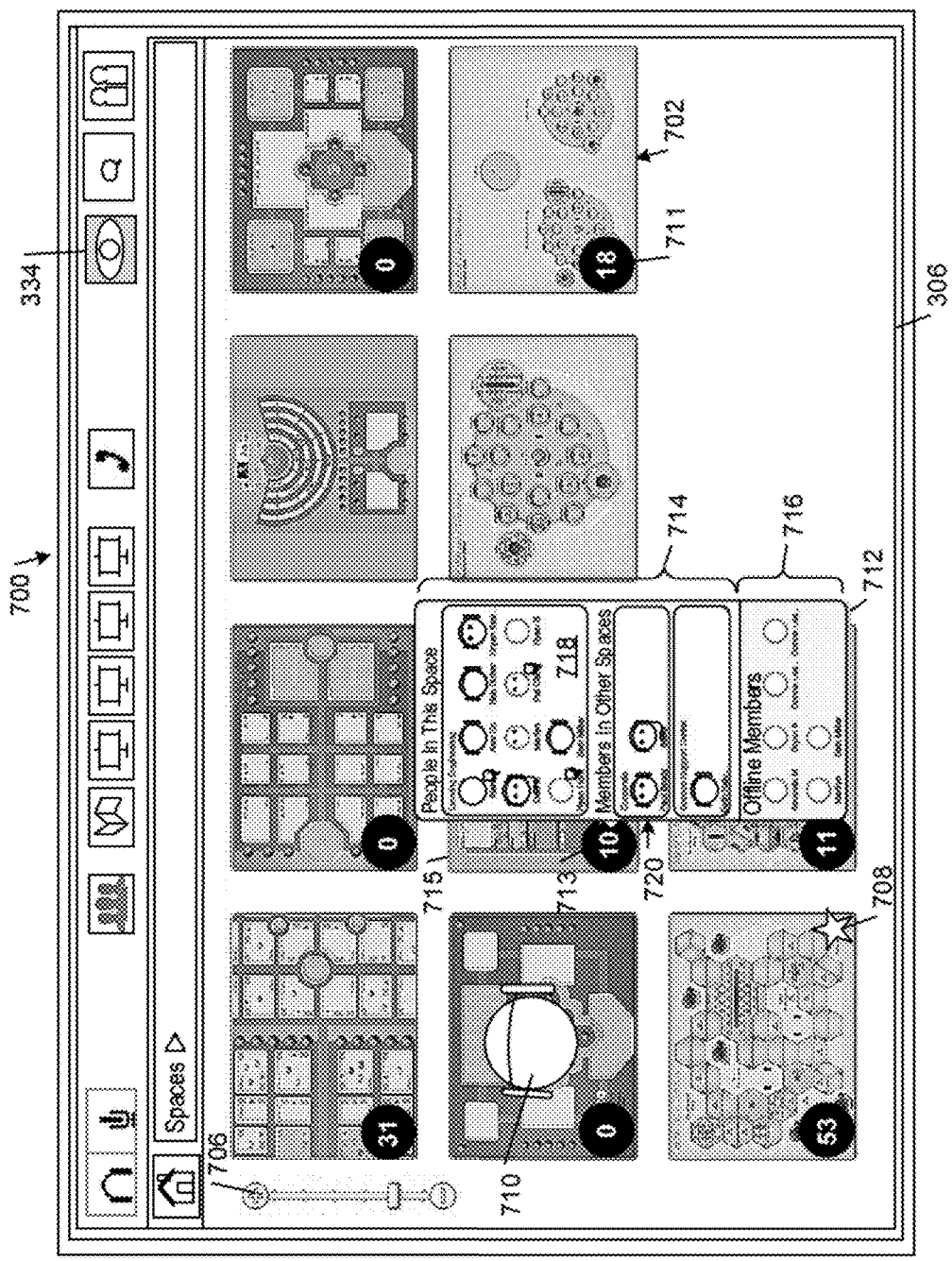
FIG. 15 is a diagrammatic view of an example of a graphical user interface.

FIG. 15 shows an example 700 of the graphical user interface 300 with the people panel 304 and the chat panel closed and the viewer panel 306 open. In this example, the viewer panel 306 shows a realtime spatial visualization 702 of each of the virtual areas of which the user is a member. Each spatial visualization 702 shows a respective two-dimensional plan view of the respective virtual area, along with graphical representations (e.g., sprites) of the communicants who are present in the virtual area in their respective zones of presence, along with visual cues indicating the communicants' current states and realtime activities. A zoom control 706 allows the user to change the view presented in the viewer panel 304 from a zoomed-out view of all the user's virtual areas of membership to a zoomed-in view of a selected one of the virtual areas. A star icon 708 is positioned over the user primary virtual area (e.g., designed default space). An enlarged version of the user's avatar 710 is positioned over the user's current virtual area of presence.

Each spatial visualization 702 is associated with a respective callout 711 that shows the total number of communicants who currently are present in the virtual area. In response to user selection of a respective one 713 of the callouts 711 associated with the spatial visualization 715 of a particular virtual area, the graphical user interface 700 generates a Members panel 712 that shows the current locations and activities of the members of the particular virtual area. The members are represented by respective avatars, which are associated with the respective name of the member. The Members panel 712 includes an online members section 714 and an offline members section 716. The online member section 714 shows the avatars of all of the members of the SOCOCO Product Development virtual area who currently are logged into the virtual communications environment grouped by virtual area, whereas the offline members section 716 shows the avatars of all of the remaining members who currently are logged out of the communications environment arranged alphabetically by first name. Of the communicants that are shown in the online members section 714, those that are present in the selected virtual area are represented in a top section 718 labeled with the name of the selected virtual area (e.g., Lansing Engineering) and those that are not present in the selected area are represented in a bottom section 720 labeled "Members in Other Spaces" where they are grouped by their respective virtual areas of presence.

Figure 16:
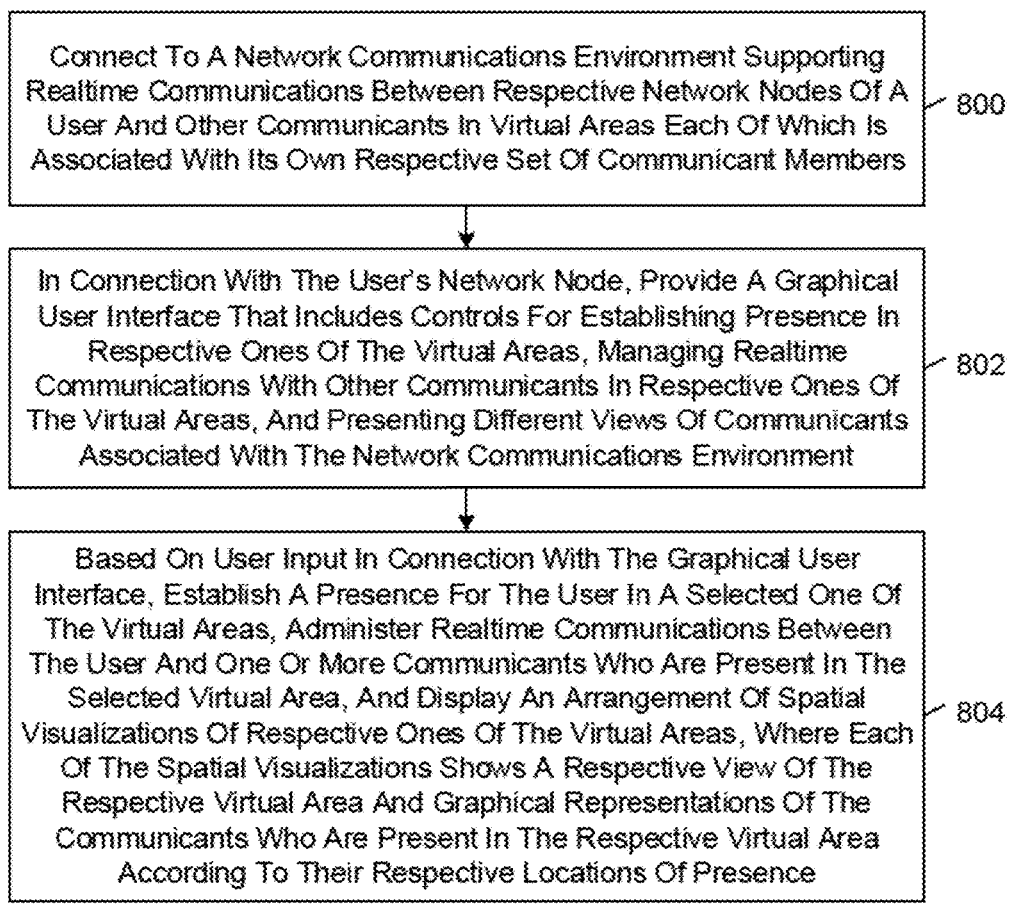
FIG. 16 is a flow diagram of an example of a method.

FIG. 16 shows an example of a method by which the client communications application generates different views on the realtime states of a user contacts and other communicants across the user's virtual areas of membership. In accordance with this method, the client communications application connects to a network communications environment supporting realtime communications between respective network nodes of a user and other communicants in virtual areas each of which is associated with its own respective set of communicant members (FIG. 14, block 680). In connection with the user's network node, client communications application provides a graphical user interface that includes controls for establishing presence in respective ones of the virtual areas, managing realtime communications with other communicants in respective ones of the virtual areas, and presenting different views of communicants associated with the network communications environment (FIG. 14, block 682). Based on user input in connection with the graphical user interface, client communications application establishes a presence for the user in a selected one of the virtual areas, administers realtime communications between the user and one or more communicants who are present in the selected virtual area, and displays an arrangement of spatial visualizations of respective ones of the virtual areas, wherein each of the spatial visualizations shows a respective view of the respective virtual area and graphical representations of the communicants who are present in the respective virtual area according to their respective locations of presence.

In some examples, each of the spatial visualizations shows visual cues indicating current states and realtime activities of the communicants who are present in the respective virtual area. Each of the spatial visualizations typically includes a respective graphic that shows a tally of the communicants who are present in the respective virtual area. Based on user input in connection with a respective one of the spatial virtualizations of a particular one of the virtual areas, examples of the client communications application present an interface element that shows the graphical representations and realtime activities of the communicants who are members of a particular one of the virtual areas and are present in the network communications environment in a first section of the visualization, and show graphical representations of the communicants who are members of the particular virtual area and are not present in the network communications environment in a second section of the visualization.

III. Conclusion

Other embodiments are within the scope of the claims.

The invention claimed is:

1. A computer-implemented method in a network communications environment comprising a network service implemented by at least one server network node and supporting realtime communications between co-present ones of a user and one or more other communicants in virtual locations that define different respective communications contexts in the network communications environment, the method comprising by the network service:

transmitting computer software to a client network node associated with the user, wherein the computer software is associated with a realtime communications platform, and a view of an instance of a communicant search interface is rendered by executing the computer software on the client network node;

establishing a presence for the user in the rendered instance of the communicant search interface;

responsive to an input of the user from the client network node in connection with the communicant search interface, ascertaining a communicant sorting criterion and generating a sorted listing of ones of the communicants based on the ascertained communicant sorting criterion;

sending to the client network node associated with the user a contact list associated with an array of respective graphical representations of the ones of the communicants who are present in respective ones of the virtual locations and sorted according to the communicant sorting criterion and, adjacent the respective graphical representation of each of the communicants in the sorted listing who currently is co-present with one or more other communicants in a respective one of the virtual locations, providing a respective toggle control that, in response to the user's input, selectively opens and closes a respective co-presence capsule that, when opened, appears in-line with the array of graphical representations and contains the respective graphical representations of the communicant in the sorted listing, the one or more other communicants who are co-present in the respective virtual location, and a respective set of one or more descriptive and ordered links configured to navigate the user's presence to the respective virtual location; and responsive to user selection of one of the links, establishing a presence for the user and configuring the client network node to communicate in the respective virtual location associated with the selected link;

wherein the respective virtual location is associated with a respective prop that is associated with respective functionality to interact with other communicants in the virtual location and a respective display name that is displayed in connection with the respective set of one or more descriptive and ordered links;

wherein the respective virtual location is associated with application sharing functionality and file sharing functionality that are activated by ones of the user and the other communicants in the respective virtual location through respective props to share applications and files respectively between their respective client network nodes over respective application sharing and file sharing channels.

2. The method of claim 1, wherein each co-presence capsule in the contact list comprises a respective boundary that visually demarcates the respective graphical representations of the communicants who are co-present in the respective virtual location.

3. The method of claim 1, wherein the communications contexts associated with a link comprise one or more of voice communication, application sharing, screen sharing, telephone communications, and text chat.

4. The method of claim 3, wherein each of one or more of the virtual locations is associated with a respective display name that is displayed in connection with the respective descriptive, ordered, link configured for user navigation.

5. The method of claim 1, wherein:

for each of the communicants in the sorted listing who currently is present in a respective one of the virtual locations the contact list comprises, a respective name associated with the communicant adjacent the respective graphical representation of the communicant; and in the contact list, the linear array of the graphical representations of the present ones of communicants is sorted alphabetically according to the names respectively associated with the communicants.

6. The method of claim 1, further comprising by the network service:

determining a respective most recent interaction between the user and each of respective ones of the other communicants based on interactions between the user and the respective ones of other communicants in the network communications environment; and in the contact list, the linear array of the graphical representations of the respective ones of the other communicants is sorted in reverse chronological order according to the determined most recent interactions between the user and the respective ones of the other communicants.

7. The method of claim 1, further comprising by the network service:

determining a respective interaction frequency between the user and each of respective ones of the other communicants based on interactions between the user and the respective ones of other communicants in the network communications environment; and in the contact list, the linear array of the graphical representations of the respective ones of the other communicants is sorted in descending order of the determined interaction frequencies between the user and the respective ones of the other communicants.

8. The method of claim 7, wherein the contact list additionally comprises a favorites section containing a linear array of graphical representations of communicants that the user has designated as favorites sorted in descending order of interaction frequencies between the user and the communicants designated as favorites in the network communications environment.

9. The method of claim 1, wherein the communicant search interface comprises a search box and the user's input comprises text entered into the search box;
further comprising identifying one or more communicants associated with names having character strings that match the text entered into the search box; and
wherein the sorted listing is a listing of the one or more identified communicants sorted alphabetically according to the identified names.

10. The method of claim 1, further comprising, responsive to user selection of a particular one of the one or more descriptive and ordered links, establishing a presence for the user in the respective virtual location, administering realtime communications between the user and the other communicants who are present in the respective virtual location, and sending instructions for displaying a visualization of the respective virtual location to the client network node associated with the user.

11. The method of claim 1, wherein, in the contact list, the graphical representations of communicants who are co-present in respective ones of the virtual locations with one or more other communicants are listed ahead of the graphical representations of communicants who are individually present in respective virtual locations.

12. The method of claim 11, wherein, in the contact list, the graphical representations of communicants who are present in respective ones of the virtual locations are listed ahead of the graphical representations of communicants who are not present in any of the virtual locations.

13. A computer-implemented method in a network communications environment comprising a network service implemented by at least one server network node and supporting realtime communications between co-present ones of a user and one or more other communicants in virtual locations that define different respective communication contexts in the network communications environment, the method comprising by a client network node associated with the user:
by an application being executed on the client network node, receiving from the network service a specification of a communicant search interface associated with a realtime communications platform, and rendering a view of an instance of the communicant search interface;
receiving from the network service a contact list comprising a linear array of respective graphical representations of the ones of the communicants sorted according to a selected sorting criterion and, adjacent the respective graphical representation of each of the communicants in a listing sorted by the selected sorting criterion who currently is co-present with one or more other communicants in a respective one of the virtual locations, providing a respective toggle control that, in response to the user's input, selectively opens and closes a respective co-presence capsule that, when opened, appears in-line with the linear array of graphical representations and contains the respective graphical representations of the communicant in the listing sorted by the selected sorting criterion, the one or more other communicants who are co-present in the respective virtual location, and a respective set of one or more descriptive and ordered links configured to navigate the user's presence to the respective virtual location; and
responsive to user selection of one of the links, transmitting the selection to the network service to establish a presence for the user and configure the client network node for communicating in the respective virtual location associated with the selected link;
wherein the respective virtual location is associated with a respective prop that is associated with respective functionality to interact with other communicants in the virtual location and a respective display name that is displayed in connection with the respective set of one or more descriptive and ordered links;
wherein the respective virtual location is associated with application sharing functionality and file sharing functionality that are activated by ones of the user and the other communicants in the respective virtual location through respective props to share applications and files respectively between their respective client network nodes over respective application sharing and file sharing channels.

14. The method of claim 13, wherein each co-presence capsule in the contact list comprises a respective boundary that visually demarcates the respective graphical representations of the communicants who are co-present in the respective virtual location.

15. A computer-implemented method in a network communications environment comprising a network service implemented by at least one server network node and supporting realtime communications between co-present ones of a user and one or more other communicants in virtual locations that define different respective communications contexts in the network communications environment, the method comprising by the network service:
transmitting computer software to a client network node associated with the user, wherein the computer software is associated with a realtime communications platform, and a view of an instance of a communicant search interface is rendered by executing the computer software on the client network node;
establishing a presence for the user in the rendered instance of the communicant search interface;
responsive to an input of the user from the client network node in connection with the communicant search interface, ascertaining a communicant sorting criterion and generating a sorted listing of ones of the communicants based on the ascertained communicant sorting criterion;
sending to the client network node associated with the user a contact list comprising a linear array of respective graphical representations of the ones of the communicants sorted according to the communicant sorting criterion; and
providing an interface element that, in response to the user's input in the communicant search interface, highlights a graphical representation of a designated one of the other communicants to locate the designated other communicant in a respective one of the virtual locations;
wherein the respective virtual location is associated with a respective prop that is associated with respective functionality to interact with other communicants in the virtual location and a respective display name that is displayed in connection with the respective set of one or more descriptive and ordered links;
wherein the respective virtual location is associated with application sharing functionality and file sharing functionality that are activated by ones of the user and the other communicants in the respective virtual location through respective props to share applications and files respectively between their respective client network nodes over respective application sharing and file sharing channels.

16. The method of claim 15, wherein the interface element comprises a search box and the user's input comprises text entered into the search box;

further comprising identifying the designated other communicant by search for names having character strings that match the text entered into the search box.

17. The method of claim 15, wherein the interface element comprises a respective descriptive ordered link configured for user navigation to the virtual location in which the designated other communicant currently is present.

* * * * *